US008537283B2

(12) United States Patent
Tran et al.

(10) Patent No.: US 8,537,283 B2
(45) Date of Patent: Sep. 17, 2013

(54) HIGH DEFINITION FRAME RATE CONVERSION

(75) Inventors: Thuy-Ha Thi Tran, Montreal (CA); Phuc-Tue Ledinh, Montreal (CA); Francois Rossignol, Ste-Marthe-S-L-LAC (CA); Chon-Tam Ledinh, Montreal (CA)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 12/761,214

(22) Filed: Apr. 15, 2010

(65) Prior Publication Data
US 2011/0255004 A1    Oct. 20, 2011

(51) Int. Cl.
G06K 9/00    (2006.01)
G06K 9/36    (2006.01)

(52) U.S. Cl.
USPC .......... 348/699; 375/240; 348/607; 348/402; 382/107; 382/276

(58) Field of Classification Search
USPC ......... 348/699, 607, 402; 375/240; 382/107, 382/276
See application file for complete search history.

(56) References Cited

U.S. PATENT DOCUMENTS

| 5,057,921 | A | 10/1991 | Robert et al. |
| 5,610,658 | A | 3/1997 | Uchida et al. |
| 5,754,237 | A | 5/1998 | Jung |
| 6,005,639 | A | 12/1999 | Thomas et al. |
| 6,011,596 | A | 1/2000 | Burl et al. |
| 6,130,912 | A | 10/2000 | Chang et al. |
| 6,160,850 | A | 12/2000 | Chen et al. |
| 6,219,436 | B1 | 4/2001 | De Haan et al. |
| 6,222,882 | B1 | 4/2001 | Lee et al. |
| 6,263,089 | B1 | 7/2001 | Otsuka et al. |
| 6,487,313 | B1 | 11/2002 | De Haan et al. |
| 6,625,333 | B1 | 9/2003 | Wang et al. |
| 6,876,703 | B2 | 4/2005 | Ismaeil et al. |

(Continued)

FOREIGN PATENT DOCUMENTS

| EP | 0647919 A1 | 4/1995 |
| EP | 1587032 A1 | 10/2005 |

(Continued)

OTHER PUBLICATIONS

Chen, Tao, "Adaptive Temporal Interpolation Using Bidirectional Motion Estimation and Compensation", IEEE ICIP 2002, vol. 2, Sep. 22, 2002 pp. 313-316, 2002.

(Continued)

Primary Examiner — Sath V Perungavoor
Assistant Examiner — Xiaolan Xu
(74) Attorney, Agent, or Firm — Haynes and Boone, LLP

(57) ABSTRACT

An image interpolator for high-definition images is presented that utilizes a two or more level hierarchical decomposition for complexity reduction. At the lowest level, after a block-based motion estimator, a pixel-based motion vector selector and a motion vector-based halo reducer, an occlusion-based adaptive motion field interpolator provides preliminary motion vectors for higher resolution level. At the high resolution level, a new motion estimation refining based on the double consideration of eventual occlusion region and motion vector precision refines the preliminary motion vectors, and again a motion vector-based halo reduction re-corrects the refined motion vectors. A new motion compensated image interpolator with controllable features for multiple interpolated images is presented. A versatile post-processing configuration for remaining artifacts may also be included.

38 Claims, 14 Drawing Sheets

(56) References Cited

U.S. PATENT DOCUMENTS

| | | | |
|---|---|---|---|
| 6,914,938 B2 | 7/2005 | Zhang et al. | |
| 7,039,109 B2 | 5/2006 | Pelagotti et al. | |
| 7,058,227 B2 | 6/2006 | De Haan et al. | |
| 7,489,821 B2 | 2/2009 | Fisher et al. | |
| 7,933,769 B2 | 4/2011 | Bessette | |
| 8,064,522 B2 | 11/2011 | Kondo et al. | |
| 8,130,845 B2 | 3/2012 | Brusnitsyn et al. | |
| 2003/0072373 A1 | 4/2003 | Sun | |
| 2004/0057517 A1 | 3/2004 | Wells | |
| 2004/0091170 A1* | 5/2004 | Cornog et al. | 382/276 |
| 2004/0246374 A1 | 12/2004 | Mishima et al. | |
| 2005/0025342 A1 | 2/2005 | Lee et al. | |
| 2005/0135482 A1* | 6/2005 | Nair et al. | 375/240.16 |
| 2005/0135485 A1* | 6/2005 | Nair et al. | 375/240.16 |
| 2005/0265451 A1* | 12/2005 | Shi et al. | 375/240.15 |
| 2006/0072790 A1 | 4/2006 | Wittebrood et al. | |
| 2006/0136402 A1 | 6/2006 | Lee | |
| 2007/0036213 A1 | 2/2007 | Matsumura et al. | |
| 2007/0121725 A1 | 5/2007 | Li | |
| 2007/0291843 A1 | 12/2007 | Chappalli et al. | |
| 2008/0074350 A1 | 3/2008 | Beon et al. | |
| 2008/0084934 A1 | 4/2008 | Agrawal | |
| 2008/0137747 A1 | 6/2008 | Yamasaki et al. | |
| 2008/0159630 A1 | 7/2008 | Sharon et al. | |
| 2008/0181306 A1* | 7/2008 | Kim et al. | 375/240.16 |
| 2008/0204592 A1* | 8/2008 | Jia et al. | 348/402.1 |
| 2008/0247461 A1 | 10/2008 | Nishida | |
| 2008/0285650 A1 | 11/2008 | Chappalli | |
| 2008/0317129 A1 | 12/2008 | Lertrattanapanich et al. | |
| 2009/0087120 A1 | 4/2009 | Wei | |
| 2009/0135913 A1 | 5/2009 | Nair et al. | |
| 2009/0161010 A1 | 6/2009 | Tran et al. | |
| 2009/0161763 A1 | 6/2009 | Rossignol et al. | |
| 2009/0316784 A1* | 12/2009 | Kervec et al. | 375/240.16 |
| 2010/0128126 A1 | 5/2010 | Takeuchi | |
| 2010/0245670 A1* | 9/2010 | Takeda et al. | 348/607 |
| 2010/0253835 A1 | 10/2010 | Zhou et al. | |
| 2010/0290532 A1 | 11/2010 | Yamamoto et al. | |
| 2010/0329344 A1 | 12/2010 | Hayase et al. | |
| 2011/0216240 A1 | 9/2011 | Ohno | |
| 2011/0216831 A1 | 9/2011 | Rossignol et al. | |
| 2011/0249870 A1* | 10/2011 | Cheng et al. | 382/107 |

FOREIGN PATENT DOCUMENTS

| | | | |
|---|---|---|---|
| EP | 1855474 | A1 | 11/2007 |
| EP | 1885132 | A2 | 2/2008 |
| EP | 1885129 | A3 | 7/2008 |
| GB | 2279531 | A | 1/1995 |
| JP | 7177501 | A | 7/1995 |
| JP | 7203462 | A | 8/1995 |
| JP | 8265777 | A | 10/1996 |
| JP | 9233435 | A | 9/1997 |
| JP | 10134193 | A | 5/1998 |
| JP | 10304371 | A | 11/1998 |
| JP | 2003078807 | A | 3/2003 |
| JP | 2005056410 | A | 3/2005 |
| WO | WO9120155 | A1 | 12/1991 |
| WO | WO0249365 | A2 | 6/2002 |

OTHER PUBLICATIONS

Choi, Byeong-Doo, et al., "Motion-Compensated Frame Interpolation Using Bilateral Motion Estimation and Adaptive Overlapped Block Motion Compensation", IEEE Transactions on Circuits and Systems for Video Technology, vol. 17, No. 4, Apr. 2007, pp. 407-416.

De Haan, G., "IC for Motion-Compensated De-Interlacing Noise Reduction and Picture Rate Conversion", IEEE Trans. On CE, vol. 45, No. 3, Aug. 1999.

Jozawa et al: "Two-Stage Motion Compensation Using Adaptive Global MC and Local Affine MC" IEEE Transactions on Circuits and Systems for Video Technology, IEEE Service Center, Piscataway, NJ, US, vol. 7, No. 1, (Feb. 1, 1997).

Kang, Suk Ju, et al., "Frame Rate Up-Conversion with Bidirectional Sub-Sampled Block Motion Estimation and Minimum Deviation Filter", International Conference on New Exploratory Technologies, Oct. 25, 2007.

Sugiyama, K., Aoki, T. & Hanghai, S., "Motion Compensated Frame Rate Conversion Using Normarized Motion Estimation", 2005 IEEE Workshop on Signal Processing Systems—Design and Implementation (SiPS 2005), Athens, Greece.

Jeon, Bo-Won, et al., "Coarse-to-Fine Frame Interpolation for Frame Rate Up-Conversion Using Pyramid Structure", *IEEE Transactions on Consumer Electronics*, vol. 49, No. 3, Aug. 2003, pp. 499-508.

Lee, Gun-Ill, et al., "Hierarchical Motion-Compensated Frame Interpolation Based on the Pyramid Structure", Y. Zhuang et al. (Eds.): PCM 2006, LNCS 4261, 2006, pp. 211-220, © Springer-Verlag, Berlin Heidelberg.

Thoma, R., et al., "Motion Compensating Interpolation Considering Covered and Uncovered Background", *Signal Processing: Image Communication*, vol. 1, 1989, pp. 191-212.

Robert P et al., "Advanced high definition 50 to 60 Hz standard conversion", Broadcasting Convention, 1988. IBC 1988. International Brighton, UK, London, UK, IEEE, UK, Jan. 1, 1988, pp. 21-24, XP006518347, ISBN: 978-0-85296-368-5.

\* cited by examiner

Figure 9 – Blending Factor for Image Interpolation

HIGH DEFINITION FRAME RATE CONVERSION

BACKGROUND

1. Field of the Invention

The present invention relates to reduction of motion compensation artifacts in a high resolution image interpolation and, more specifically, to halo reduction in a hierarchical approach.

2. Discussion of Related Art

Image interpolation based on motion compensation is a well-established technique for frame rate conversion (FRC) and is often utilized to increase the refresh rate in video. In such applications, motion appears more fluid and a high refresh rate is more suitable, for example, for LCD panels.

FRC is very challenging to perform, however, particularly in high definition television HDTV. Compared to standard definition video, HDTV involves larger picture formats and also larger motion vectors MV in terms of absolute pixel numbers. These differences in HDTV result in expensive motion estimation and in a large halo region.

Expensive motion estimation ME involves using suitable approaches for complexity reduction that may include, for example, a 3-step search, a log D step search, and a hierarchical approach. Hierarchical-search approaches, which are more generic than the 3-step or logD-step searches approaches, utilize appropriate filtering for each image reduction.

Halo reduction, even for standard definition television SDTV, is still an active area of research. R. Thoma & M. Bierling, "Motion Compensating Interpolation Considering Covered and Uncovered Background", Signal Processing: Image Communication 1, 1989, pp 191-212, describes a system that involves both hierarchical search and halo reduction. The authors suggested a hierarchical approach for ME complexity reduction and halo detection for the limited case of still backgrounds, which can be utilized in the teleconferencing environment. Other solutions have been suggested that attempt to address independently one of the hierarchical ME approach or halo reduction.

Not restricted only for HDTV, the hierarchical approach for ME complexity reduction can be used for various image formats from CIF, SIF-50, SIF-60 Intermediate Formats, to SDTV-50, SDTV-60 television formats, in real-time processing. The hierarchical techniques are based on a pyramidal decomposition of an image into many sub-resolution images by appropriate anti-alias filtering and image decimation. The ME is thus evaluated from low to original (high) resolution. As previously mentioned, unfiltered versions of hierarchical approaches include the well-known three steps search, or more generally, the "logD-step" technique working directly with pixels in original resolution.

Of course, the coarse-to-fine hierarchical approaches are sub-optimal solutions to compare with the optimum exhaustive but expensive full search technique. However, a hierarchical method is commonly chosen when the image processor technology is not fast or economical enough to perform a full-resolution approach.

There have been various hierarchical algorithms developed only for ME complexity reduction. The previously cited reference from the technical paper of R. Thoma & M. Bierling, 1989, was based on the "logD-step" search technique with low-pass filtering and holes and overlapped regions correction. Similar ME using a 3-level pyramidal decomposition are presented in U.S. Pat. Nos. 5,610,658 and 5,754,237. For further complexity reduction, the disclosure in U.S. Pat. No. 6,130,912 suggested a 3-step search with integral projections on vertical and horizontal axes of each super micro-block. The disclosure in U.S. Pat. No. 6,160,850 suggests 3-step search techniques and an appropriate control unit for reducing required memory. In the HDTV application, the inventors in US 2008/0074350 A1 have suggested the use of two processor devices for horizontal sharing of the high resolution interpolation.

The most elaborated hierarchical techniques for FRC are probably described by B. W. Jeon, G. I. Lee, S. H. Lee and R. H. Park, "Coarse-to-Fine Frame Interpolation for Frame Rate Up-Conversion Using Pyramid Structure", IEEE Transactions on Consumer Electronics, Vol. 49, No. 3, August 2003, pp 499-508. An almost identical proposal by the same two authors G. I. Lee and R. H. Park is also presented in "Hierarchical Motion-Compensated Frame Interpolation Based on the Pyramid Structure", Y. Zhuang et al. (Eds.): PCM 2006, LNCS 4261, pp. 211-220, 2006, © Springer-Verlag, Berlin Heidelberg 2006. In order to reduce holes and overlapped regions effects, since the second hierarchic level, the authors suggested an estimation of independent forward and backward MV determination. For this purpose, the authors required an interpolated image combined from the previous level estimated MV and from moving details of the two existing images. Thus, many (3) additional interpolations for each hierarchical level are performed. Moreover, in occlusion regions, estimated MV is generally not correct. Anyway, in these publications, no consideration for halo artifacts due to false MV determination is mentioned.

Holes are created in an interpolated image when there is no estimated MV from a pixel in a reference or exiting image to an interpolated image. Inversely, overlapped regions are created when there are many possible MVs from reference or exiting images to interpolated images. Halo effects are essentially due to erroneous MV estimations in occlusion areas, which occur around a foreground object in an image in a video sequence when the object is moving relative to a background.

There has been various halo reduction (HR) algorithms developed. Solutions from multi-frame (more than two frames) to two-frame solutions have been proposed. Even with better potential for HR, multi-frame solutions are expensive.

Two-frame solutions are generally composed of halo region or precisely covering/uncovering region detection and halo reduction. U.S. Pat. Nos. 6,219,436, 6,487,313 and 7,039,109 describe typical representative techniques for performing two-frame solutions. Covering/Uncovering region detection is based on some metrics such as ME error, MV length and MV border. These parameters are not necessarily reliable in an occlusion region and make the desired detection difficult. The halo reduction becomes, in turn, an ad-hoc technique using the mean or the median value provided from many possible filtering techniques.

In the cited technical publication of R. Thoma & M. Bierling, 1989, the Covering/Uncovering region detection is based on the estimated MV and the supposition of fixed background usually in teleconference applications. The halo reduction is therefore an image interpolation adaptive to detected regions. Still background supposition is somewhat specific or restrictive, and not always correct for moving television signals.

For those familiar with FRC, there are many specific cases where the ME cannot adequately provide a 'good' solution. Thin fast moving objects, such as a balancing hammock net, yield erroneous motion vectors in a very large region. The resulting noticeable halo, even in a still background such as a still lawn with a hammock net, is difficult to properly correct. In other cases, for example fade-in fade-out with background light turning on and off, the ME can make a foreground object disappear or re-appear.

Therefore, there is a need for better MV and ME estimations in performing FRC operations.

BRIEF SUMMARY

In accordance with some embodiments of the present invention, a frame rate converter system is disclosed. A method of interpolating a high definition image between a first image and a second image according to some embodiments of the present invention includes reducing the first image and the second image to form a first lower image and a second lower image; estimating block-based motion vectors from the first lower image and the second lower image; selecting pixel-based motion vectors based on the block-based motion vectors; filtering the pixel-based motion vectors for halo reduction from the selected motion vectors to form filtered motion vectors; occlusion-based, adaptively interpolating the filtered motion vectors to provide for higher resolution motion vectors with a higher resolution; refining high resolution motion vectors that are derived from the higher resolution motion vectors to form refined motion vectors; providing high resolution halo reduction to the refined motion vectors; and interpolating an interpolated image between the first image and the second image based on the refined motion vectors.

A hierarchical resolution image interpolator according to some embodiments of the present invention includes an image reducer that provides a first lower image and a second lower image from a first image and a second image; a block-based motion estimator coupled to the image reducer that provides block-based motion vectors based on the first lower image and the second lower image; a motion vector selector coupled to the block-based motion estimator that provides pixel-based motion vectors based on the block-based motion vectors; a halo-reduction filter coupled to the motion vector selector that filters the pixel-based motion vectors to form filtered motion vectors; an occlusion-based adaptive interpolator coupled to the halo-reduction filter to provide for higher resolution motion vectors based on the filtered motion vectors; a high-resolution refiner coupled to receive high-resolution motion vectors related to the higher-resolution motion vectors and form refined motion vectors; a high-resolution halo-reduction filter coupled to the high-resolution refiner to further filter the refined motion vectors to form filtered refined motion vectors; and an interpolator coupled to the high-resolution halo-reduction filter, the interpolator providing an interpolated image between the first image and the second image based on the filtered refined motion vectors.

These and other embodiments consistent with the invention are further described below with reference to the following figures.

In the figures, to the extent possible, elements having the same or similar functions have the same designations.

DETAILED DESCRIPTION

In accordance with aspects of the present invention, embodiments of a hierarchical image interpolator is disclosed. It should be understood that the invention should not be limited by this disclosure. Further, embodiments of the invention can be performed on any device capable of processing images, for example on a computer system executing software, on a microprocessor or other processor executing software, in hardware, or any combination of these.

In an image interpolation, the exhaustive ME requires the most operations and calculations. Usually, such image processors do not have sufficient bandwidth or capacity to fully implement the operation. In order to reduce the complexity, various ME techniques have been proposed. Among these techniques, hierarchical approaches have been proposed in the past, even for low or medium resolution image formats. CIF, SIF, SDTV are common cited formats for teleconference environments and standard television.

The hierarchical process is mainly a tree decomposition of an original image into many resolution level sub-images. The original resolution image or first level image after a first filtering and decimation yields a lower resolution sub image determining the $2^{nd}$ level image. The filtering and decomposition process continues for the obtained sub-image to provide a $3^{rd}$ level sub-image, and so on in the pyramidal hierarchical decomposition. For image interpolation, it is common to decompose the two adjacent images in a video sequence in 3 or 4 levels.

Figure 1:
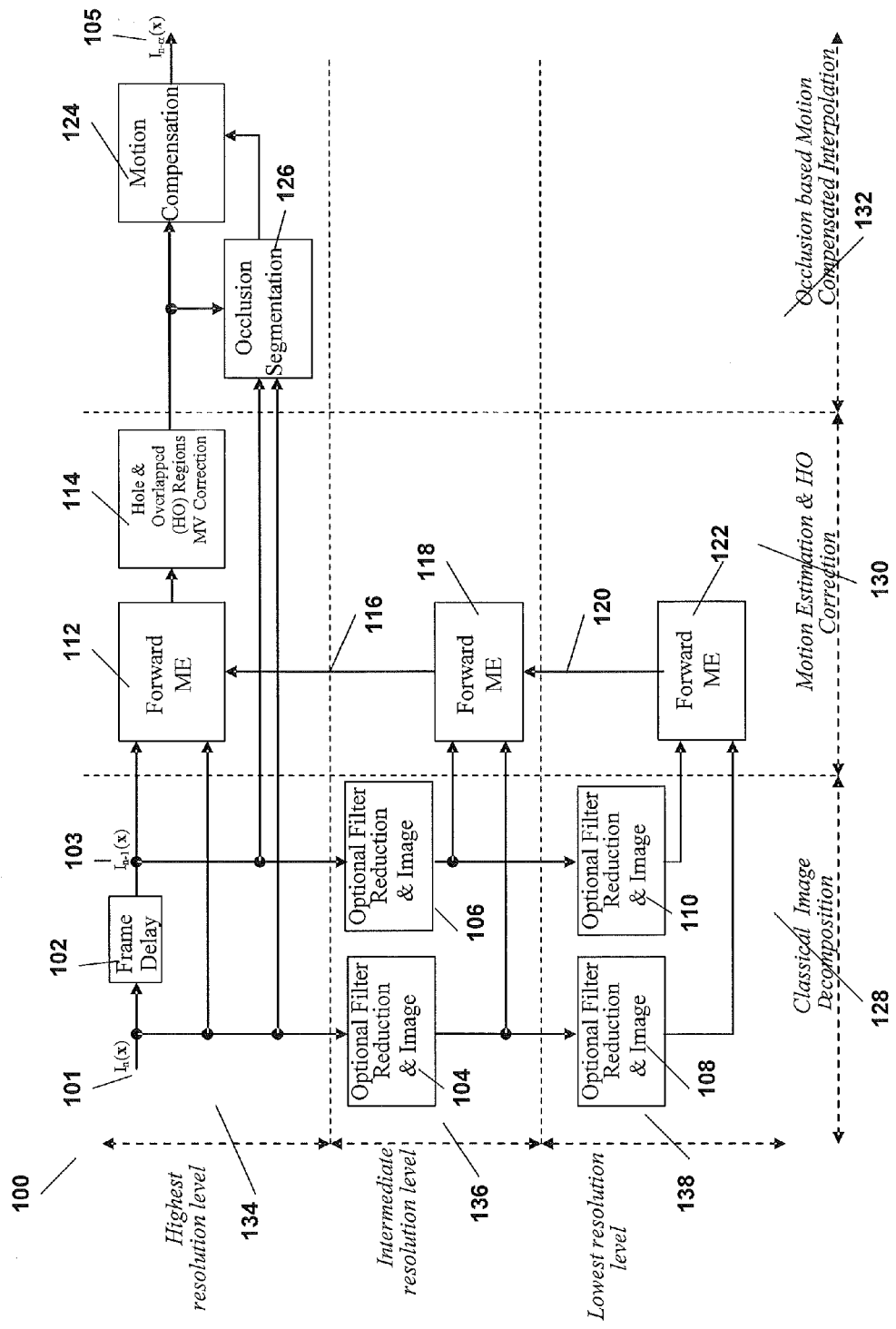
FIG. 1 shows a block diagram of an example hierarchical image interpolator.

FIG. 1 illustrates a frame rate converter (FRC) 100 with three hierarchical levels, levels 134, 136, and 138, as described, for example, in R. Thoma & M. Bierling, 1989. As shown in FIG. 1, FRC 100 includes high resolution level 134, intermediate resolution level 136, and low resolution level 138. FIG. 1 also illustrate processing elements of a Classical image Decomposition 128, Motion Estimation (ME) 130, and Hole-Overlapped Regions (HO) correction, and Motion Compensated Interpolation (MCI) with an Occlusion Detection 132. As shown in FIG. 1, an image 101 is delayed in a frame delay 102 so that both image $I_n(x)$ and $I_{n-1}(x)$, where n designates the frame timing and x designates a pixel position, are present. In intermediate resolution level 136 during image decomposition 128, both image $I_n(x)$ and $I_{n-1}(x)$ are decimated in filters 104 and 106, respectively. The output images from filters 104 and 106 can be decimated again in filters 108 and 110 in low resolution level 138 decomposition 128. The low resolution images from filters 108 and 110 are provided to forward ME 122 so that a low resolution forward motion estimation can be performed in level 138, motion estimation 130. The output forward ME 120 from forward ME 122 are input along with the intermediate resolution images from filters 104 and 106 to forward ME 118, which an intermediate level motion estimation is produced in level 136, motion estimation 130. ME 116 produced by forward ME 118 are then input to forward ME 112 along with high resolution images $I_n(x)$ and $I_{n-1}(x)$. As illustrated, ME can be started from the two corresponding images of lowest resolution (but highest level) output from filters 108 and 110, sent and refined successively at higher resolution levels by using corresponding level images in Forward ME estimators 118 and 112.

If motion vectors are estimated for blocks or pixels in an existing image, there is usually hole or overlap artifacts (HO) on the resulting interpolated images. HO correction 114 can be utilized to correct for these overlaps. Since motion vector estimation is not necessarily reliable in occlusion regions, motion vector refinement at higher resolution such as that output by forward ME 112 cannot yield the true motion vector. Therefore, occlusion segmentation 126 detects occlusions directly from high resolution images $I_n(x)$ and $I_{n-1}(x)$ and the corrected MEs output from HO correction 114. The output signal from occlusion detection 126 and the corrected MEs output from HO correction 114 are then input to motion compensation 124 that finally produces the interpolated image $I_{n-\alpha}(x)$, where $\alpha$ represents the timing position between image $I_n(x)$ and $I_{n-1}(x)$ that is to be interpolated. However, the detection of halo regions, which are due to erroneous motion vectors, is based on the still background hypothesis from the teleconference environment. The subsequent motion compensated image (MCI) is also based on this supposition because motion vectors in detected halo regions are set to be zero in FRC 100.

Figure 2:
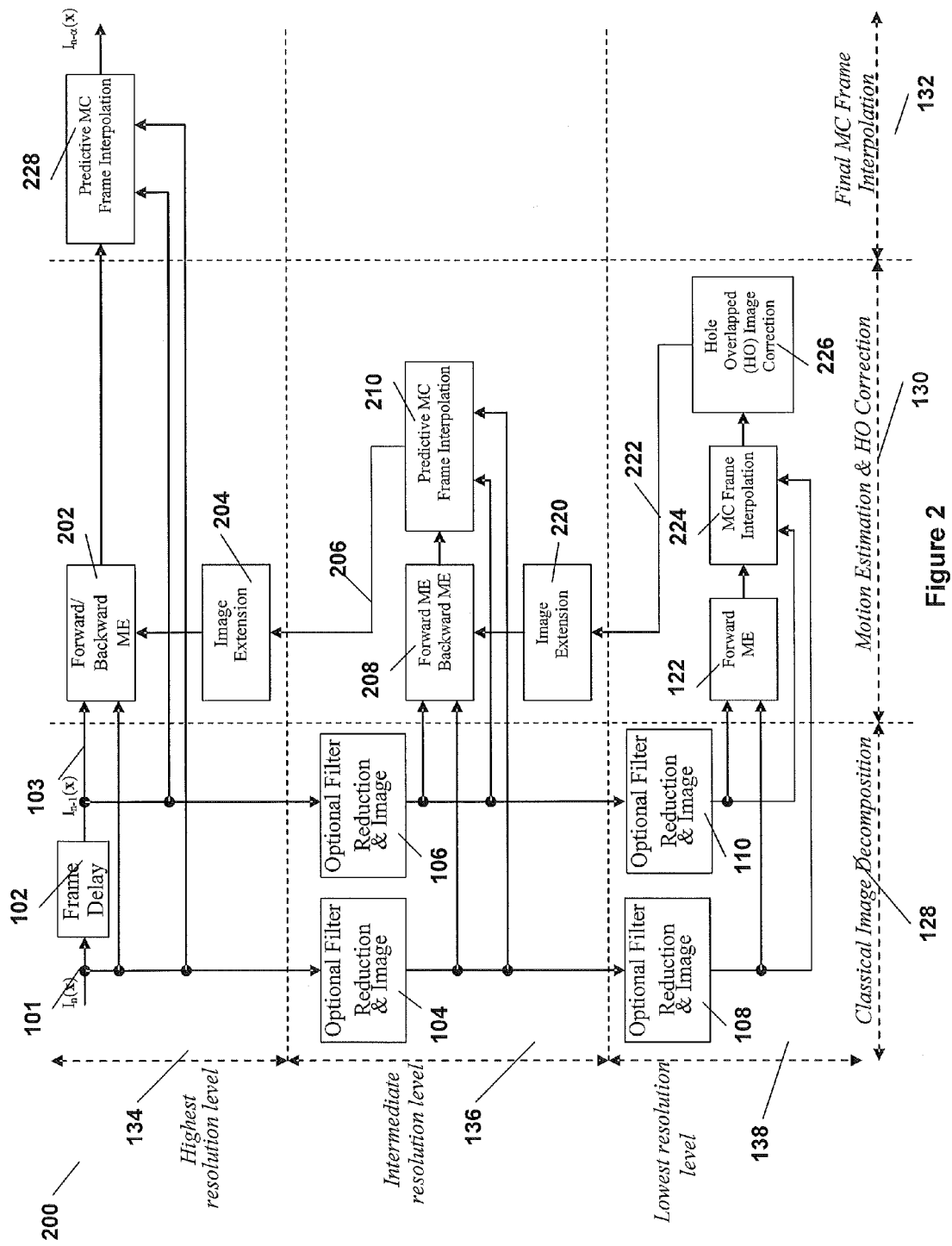
FIG. 2 shows a block diagram of an example hierarchical image interpolator.

FIG. 2 illustrates an FRC 200 similar to that described, for example, in G. I. Lee & R. H. Park. As before, there are three resolution levels: high resolution 134, intermediate resolution 136, and low resolution 138. Level processing are also delimited: classical decomposition 128, motion estimation 130, and HO correction and final MC interpolation 132. As is shown, classical image decomposition 128 is substantially the same as that shown in FIG. 1 for FRC 100. In low resolution 138, motion estimation 130 includes forward motion estimate 122. The motion estimation provided by forward ME 122 is input to MC frame interpolation 224, which provides an interpolation of the motion compensation based on the ME produced by forward ME 122 and the low-resolution images produced by filters 108 and 110. Hole and Overlapped image correction 226 corrects the motion compensation provided by interpolation 224 for holes and overlapping and provides a low resolution corrected motion compensation 222 to image extension 220. Halo correction in occlusion regions is not considered in FRC 200.

At intermediate level 136, the previous low resolution image generated by image correction 226 is firstly extended to intermediate resolution in image extension 220. Image extension 220 utilizes a zooming of low resolution image 222, and also two other MC interpolations from existing medium level images for a detail enhanced zoomed image The extended image is the input to ME 208 where a forward ME and a backward ME is generated based on the extended image and intermediate level images from filters 104 and 106 as well as their associated Laplacian images. Resulting Forward and Backward MV from ME 208 are used in frame interpolation 210 to provide a MC interpolated intermediate level image 206. Intermediate resolution image 206 is input to image extension 204, again without consideration of halo. The extended image from image extension 204 is input to ME 202, where forward and backward MEs in high resolution level 134 are generated. Finally, in frame interpolation 132 the MC image generated by ME 202 along with images 101 and 103 are input to frame interpolation 228 to produce image $I_{n-\alpha}(x)$.

As shown in FIG. 2, MC image $I_{n-\alpha}(x)$ is affected without halo consideration. Therefore, the MV are still erroneous in occlusion regions. Consequently, proposed high frequency detail enhancements and forward and backward ME can no longer be valid in occlusion regions. Further, it is worthwhile to note that there are many costly MC interpolations utilized in FRC 200, which makes FRC 200 costly and complicated to implement.

Some embodiments of the present invention provide for a combination of halo effect reduction and hierarchical decomposition for an efficient high-definition frame rate conversion. At each decomposition level, motion vectors are refined in a single step search, with different motion vector resolution in each level. Moreover, in order to correct large halo regions, erroneous motion vectors are re-estimated and adaptively interpolated for the next hierarchy. At the final hierarchical level or highest resolution, an adaptive image interpolation technique can be utilized. Such an approach may unify important features such as, for example, linear/nonlinear motion compensation, halo consideration, and temporal position of the desired interpolated frame. After the image interpolation, some post processing structures are proposed for various default corrections.

An image interpolator for a high resolution image that is consistent with embodiments of the present invention can include, for example, a two level hierarchical decomposition. At the lowest resolution level, a motion estimator and motion filter that estimates and filters block-based motion vectors between a first image and a second image of lowest resolution can be utilized; a motion vector selector that provides for each pixel in the interpolated image to be associated with motion vectors based on block-based motion vectors, avoiding at the same time hole and overlapped regions effects, can be utilized; halo and isolated motion vector reducers that correct the selected motion vectors can be provided; and an occlusion-based adaptive motion vectors interpolator that provides estimated motion vectors for the next hierarchical level can be implemented. At the highest resolution level, a motion vector re-estimator that provides refined motion vectors for the considered level resolution can be provided; halo and isolated motion vectors reducers that corrects again the refined motion vectors to form level corrected motion vectors can be utilized; an adaptive image interpolator that provides an interpolated image based on level corrected motion vectors can be utilized; and post-processors that provide final corrections in the interpolated image of other remaining artifacts, for example such as halo in still detailed background, lattice post processing, and temporal background in-out fading can be implemented.

An image interpolator for high resolution images that is consistent with embodiments of the present invention can also include a three or more level hierarchical decomposition. At the lowest resolution level, a motion estimator, a motion filter, a motion vector selector, a halo and isolated motion vector reducer, and an adaptive motion vector interpolator similar to those previously described in a two hierarchical level decomposition can be implemented. At the highest resolution level, a motion vectors re-estimator, a halo and isolated motion vector reducer, an adaptive image interpolator, and post-processors can be implemented. At each intermediate resolution level, a motion vectors re-estimator, a halo and isolated motion vector reducer and an adaptive motion vector interpolator similar can be implemented.

Figure 3:
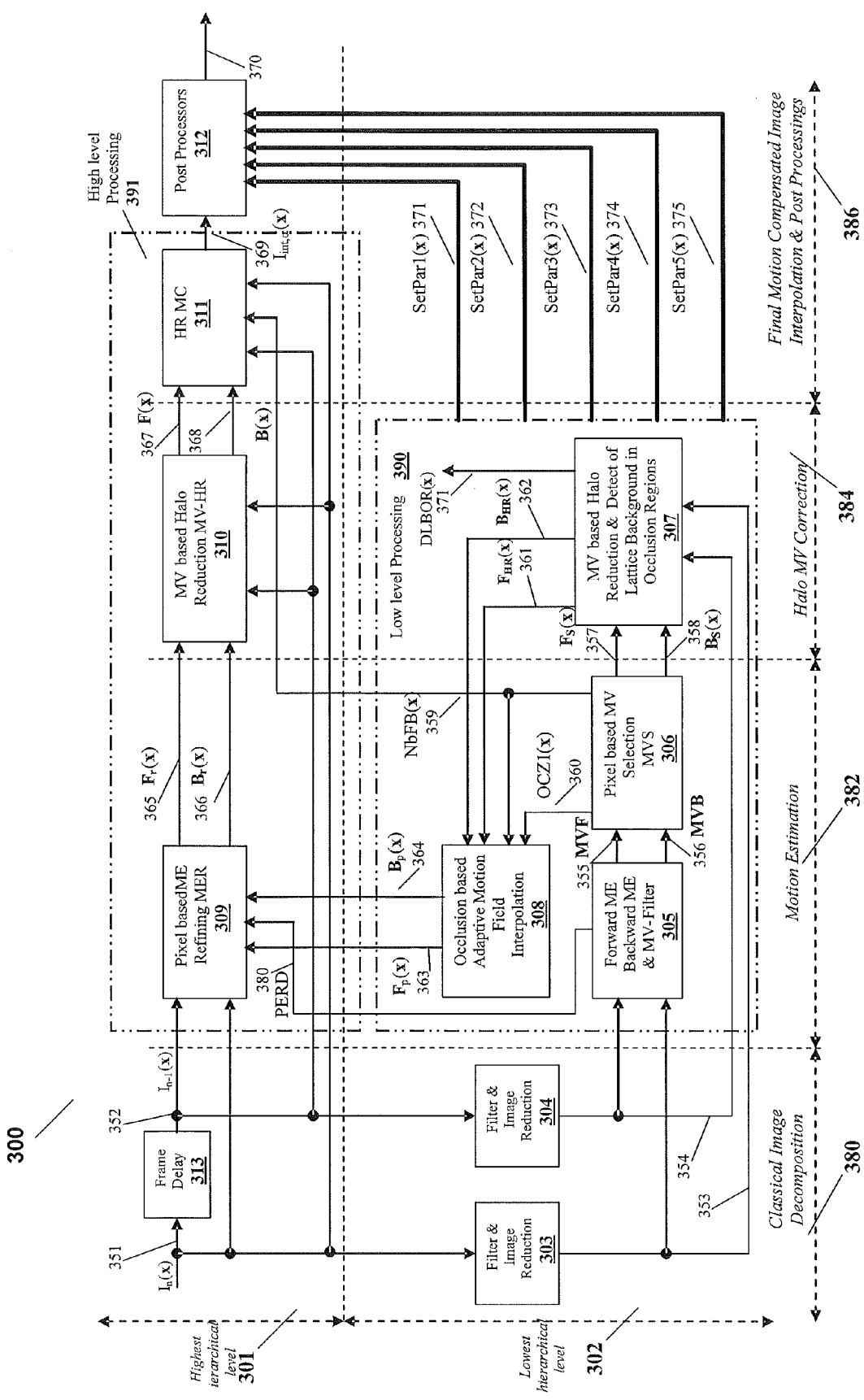
FIG. 3 illustrates a block diagram of an embodiment of a two-level hierarchical image interpolator consistent with some embodiments of the present invention.

FIG. 3 illustrates a high-definition FRC 300 with a two hierarchical level decomposition, high level 301 and low level 302. Further, there are four stages of processing: image decomposition 380, motion estimation 382, halo MV correction 384, and post processing 386. Existing image $I_n(x)$ 351 and its frame delay version $I_{n-1}(x)$ 352, which is generated by frame delay 313, are common inputs in FRC 300. An interpolated image 369 $I_{n-\alpha}(x)$ is provided between the two existing images, which is input to post processors 312. Alpha ($\alpha$), a frame distance fractional value, is the time-distance between the existing image $I_n(x)$ and the desired interpolated image $I_{n-\alpha}(x)$; meanwhile x denotes the vector representing the current pixel coordinates in column and row.

As shown in FIG. 3, image $I_n(x)$ 351 is input to filter 303 and image $I_{n-1}(x)$ 352 is input to filter 304. In some embodiments of the invention, filter 303 and filter 304 provides a 3×3 image reduction, which is contrary to the usual 2×2 reduction utilized in conventional hierarchical systems. If the HD image input format is 1920×1080, the chosen factor 3×3 provides a format of 640×360 for reduced HD images 353 and 354. The 640×360 format, smaller than the standard TV format of 720×486 is suitable for the present state of the art of image processor. In general, the chosen reduction factor is not limited to 3×3, but can be any reduction factor.

Filters 303 and 304 can also include anti-aliasing filters. In some embodiments, the anti-aliasing filters for image reduction can be separable vertical/horizontal filters for simplification purpose. An example filter impulse response that can be utilized in some embodiments is given by (10, 32, 44, 32, 10)/128, which designates the operation $$(10*I_n(x)+32*I_{n-1}(x)+44*I_{n-2}(x)+32*I_{n-3}(x)+10*I_{n-4}(x))/128. \quad (1)$$

The reduced and filtered HD images 353 and 354 are then input to ME subsystem 305, which performs the following block-based operations: Search Range Adaptive Forward ME, Search Range Adaptive Backward ME, and Motion Vector Filtering (MV-Filter). The MV-Filter is disclosed in U.S. patent application Ser. No. 12/719,785, entitled "Apparatus and Method for Motion Vector Filtering Based On Local Image Segmentation and Lattice Maps," filed on Mar. 8, 2010, which is herein incorporated by reference in its entirety. Search Range Adaptive Forward/Backward ME is described by the present inventors in US Publication 2009/0161763 A1, which is incorporated by reference in its entirety.

In Publication US 2009/0161010 A1, which is also herein incorporated by reference in its entirety, a MV at a given pixel centralized in a sliding window is analyzed and corrected. The MV correction is based on local segmentations of pixel intensities and of MV in the window. Corrected MVs can be used in final image interpolation for halo reduction. However, for HDTV resolution with large motions, sliding windows of small dimension are not enough and large windows are not necessarily economical.

Similarly, if the ME technique described in related US 2009/0161763 A1 is used at the lowest resolution there is still a need to refine MVs at higher resolution in a hierarchical decomposition. The ME in US 2009/0161763 A1 is essentially an exhaustive full search with lattice-based adaptive search range.

ME subsystem 305 performs independent forward and backward motion estimations, resulting in output of forward MV (MVF) 355 and backward MV (MVB) 356. In occlusion regions, MVF 355 and MVB 356, even though erroneous, are generally different. Inversely, in non occlusion regions, MVF 355 and MVB 356 are generally aligned and equal in magnitude. Both MVF 355 and MVB 356 can therefore provide useful indices for halo correction. The MV-Filter portion of ME subsystem 305 provides, as possible, the smoothness in a motion field by reducing erroneous MV. In some embodiments, ME subsystem 305 includes two MV Filters that independently filter MVF 355 and MVB 356. The filtered MVF 355 and MVB 356 are sent to a pixel based Motion Vector Selection (MVS) 306.

As disclosed in US Publication 2009/0161763 A1, ME using block-based FFT analysis provides some lattice map which can easily yield a binary signal PERD 380 representing the periodic detection on/off result of a lattice. As defined in the publication, ME system 305 can provide two lattice information signals: a horizontal lattice period value and a vertical lattice period value. These signals may be thresholded and combined with OR logic to generate a periodic detected binary signal. The periodic detected binary signal may be filtered using binary add-remove filter to remove isolated points or emphasize areas of interest to provide the binary signal PERD 380. The signal PERD 380 from ME system 305 can be utilized in other portions of FRC 300

MVF 355 is defined as the motion vector of a block in the existing previous image $I_{n-1}(x)$, similarly MVB 356 corresponds to the existing present image $I_n(x)$. MVS 306 provides for each pixel in the interpolated image $I_{n-\alpha}(x)$ a forward MV and a backward MV, $F_S(x)$ 357 and $B_S(x)$ 358. Some embodiments of MVS 306 are disclosed in US Publication 2009/0161010, which is incorporated herein by reference in its entirety. As disclosed in US Publication 2009/0161010, MVS 306 can select one of, for example, 25 surrounding block-based motion vectors that can pass through the pixel currently under consideration. The selection is based on a sum of absolute differences (SAD) calculation in small motion compensated windows in $I_{n-1}(x)$ and $I_n(x)$ for each motion vector passing through the considered pixel in $I_{n-\alpha}(x)$. MVS 306 performs the selection individually for MVF 355 and MVB 356. Because each pixel has a motion vector, Hole and Overlapped region (HO) artifacts are eliminated in interpolated image $I_{n-\alpha}(x)$. Moreover, pixel-based MVS such as that performed in MVS 306 has the additional benefit of reducing blocking effect artifacts because, at the block borders, each pixel can have a different motion vector.

In FRC 300, it is important to note that pixel based $F_S(x)$ 357 and $B_S(x)$ 358 provided by MVS 306 are dependent on the position alpha $\alpha$ of the desired interpolated image. It will be the same for any subsequent MV after the calculations performed in MVS 306. However, to lighten the notation and text, the alpha α in many cases will not be specifically expressed.

The main output signals generated by MVS 306 are pixel based $F_S(x)$ 357 and $B_S(x)$ 358 at the pixel coordinates x. MVS also provides two pixel-based signals NbFB(x) 359 and OCZ1(x) 360 for further considerations. For comprehensive purpose, NbFB(x) is the number of pixels in a sliding window of dimensions N×M such that at these pixels MVB 356 applied from the reduced past image $I_{n-1}(x)$ 354 can yield better result than MVF 355 applied from the reduced present image $I_n(x)$ 353. In some embodiments, N×M, for example, can be 7×9. The corresponding normalized value EF(x), which is equal to NbFB(x)/(N×M), is often used in some mathematical expressions for commodity. The definition of NbFB and its details can be found in US Publication 2009/0161010 A1. Pixel-based eventual Occlusion Zone OCZ1(x) 360 indicates whether the normalized forward or backward ME errors from MVS 306 (not illustrated) are bigger than a suitable threshold value.

It should be kept in mind that $F_S(x)$ 357 and $B_S(x)$ 358 represent both vertical and horizontal MVs, and therefore, for each position x, there are four values. Similarly, OCZ1(x) 360 and NbFB(x) 359 includes four values each corresponding to the vertical and horizontal components of each of $F_S(x)$ 357 and $B_S(x)$ 358.

The motion vector outputs $F_S(x)$ 357 and $B_S(x)$ 358 and 358 are applied to the Halo reduction subsystem 307 for MV based Halo Reduction (MV-HR) and Detection of Lattice Background in Occlusion Regions (D-LBOR). There are 2 MV-HR for each MV field of $F_S(x)$ or $B_S(x)$. MV-HR and D-LBOR have also been described in US 2009/0161010 A1 for standard television definition.

Figure 4:
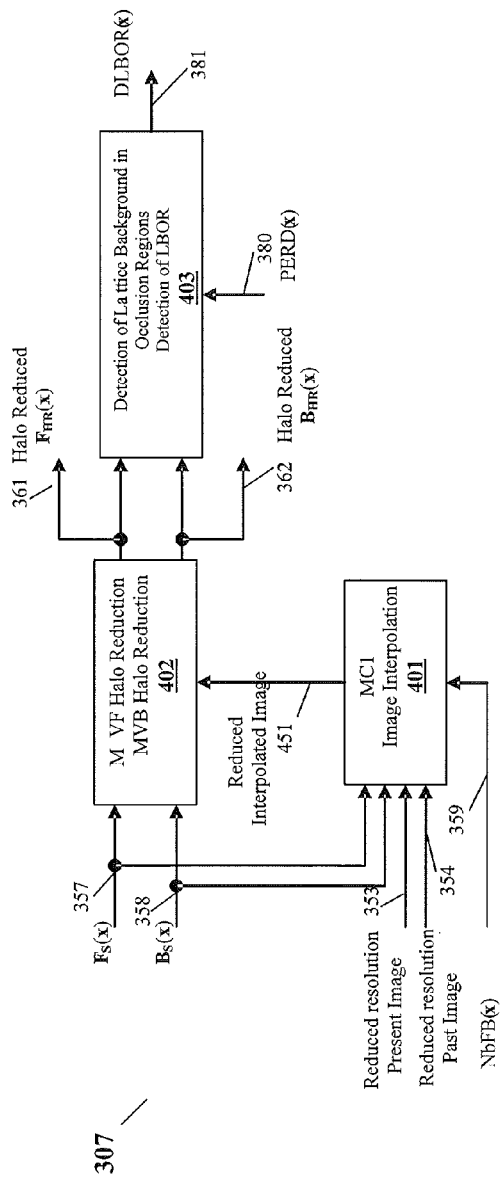
FIG. 4 illustrates a block diagram of motion vector (MV) halo reduction and detection of Lattice Background in Occlusion Regions (LBOR) according to some embodiments of the present invention.

For illustration purpose, a simplified block diagram of the subsystem 307, MV-HR and DLBOR, is illustrated by FIG. 4. Inputs to subsystem 307 in the embodiment shown in FIG. 4 include $F_S(x)$ 357, $B_S(x)$ 358, reduced resolution present image 353, reduced resolution past image 354, and NbFB(x) 359. Each of these input signals are received by MC1 Image Interpolation 401 to provide a reduced resolution motion compensated interpolated image 451, which is sent in turn to MV-HR 402. For the halo reduction purpose, MC1 interpolation does not provide high precision result, and therefore may utilize separable linear interpolation.

In some embodiments, the principle of MV based Halo Reduction 402 can be based on local binary segmentations in a pixel-based sliding window. A window dimension of I×J=5×11, for example, can be used in the implementation. Using reduced interpolated image 451, the first segmentation based on luminance intensities divides the window into two classes of pixels, pixels of similar intensities to the central pixel or pixels without similar intensities with the central pixel. The second segmentation is based on MVs and are pixels with a similar MV with that of the central pixel and pixels that do not have a similar MV with that of the central pixel. In analyzing these two binary segmentations, the central window pixel can be classified as in a halo group 1 and its motion vector should be corrected if the central pixel has different intensity to a group 2 of pixels in the window having the similar motion vectors to that of central pixel. The consequent MV correction consists thus of substituting the original central pixel MV by the average MV of the group 3 of pixels with similar intensity but different MV to the original central pixel MV. Of course, for skilled people in the art, in order to get reliable classification and correction, other features such as motion estimation errors provided by MVS (not illustrated) and the pixel numbers in the cited 3 groups should be also considered in the group classifications. Various details for HR 402 are further disclosed in US 2009/0161010 A1.

It is interesting to note that the window dimension I×J can affect the halo reduction result produced by HR 402. In order to correct the MV, the window should be sufficiently large to contain the three previously cited groups of pixels. In other word, for HDTV, if the MV is big, without hierarchical image reduction technique, the window size can be excessive and not practical. Moreover, for many reasons, pixel classification is not necessarily good enough, 'corrected' MV at halo region border after a zooming back from reduced to full resolution can be insufficiently precise. Hierarchical approaches thus offer a possibility to refine halo correction at higher resolution levels as well.

In FIG. 4, the HR 402 outputs, halo reduced MV $F_{HR}(x)$ 461 and $B_{HR}(x)$ 462 for forward and backward motion vectors, respectively, which are applied to the D-LBOR 403. D-LBOR 403 detects possible lattice or periodic background in occlusion regions. Some embodiments of D-LBOR 403 have been described in US 2009/0161010 A1. D-LBOR 403 yields at its output the pixel-based detected signal DLBOR(x) 371 for further consideration.

Referring back to FIG. 3, the halo reduced MV $F_{HR}(x)$ 461 and $B_{HR}(x)$ 362, together with NbFB(x) 359 and OCZ1(x) 360 from the subsystems 307 and 306, are now sent to Occlusion-based MV Interpolation 308. MV Interpolation 308 provides pixel-based forward and backward MV for higher resolution level 301 from low level resolution 302 motion vectors. There are two aspects to be considered for the MV interpolation performed by interpolation 308. The first aspect is the economical purpose. Since each motion vector is composed of a horizontal and a vertical component, $F_{HR}(x)$ 461 and $B_{HR}(x)$ 462 include four motion fields. At high resolution, the amount of motion information becomes non negligible. In some embodiments, a simplification of the full motion field interpolation can be performed in interpolation 308. The second aspect relates to the occlusion regions. Linear filter interpolation of low level MV, even corrected, can be a risky operation which may introduce new erroneous MV in the surrounding occlusion regions.

Figure 5:
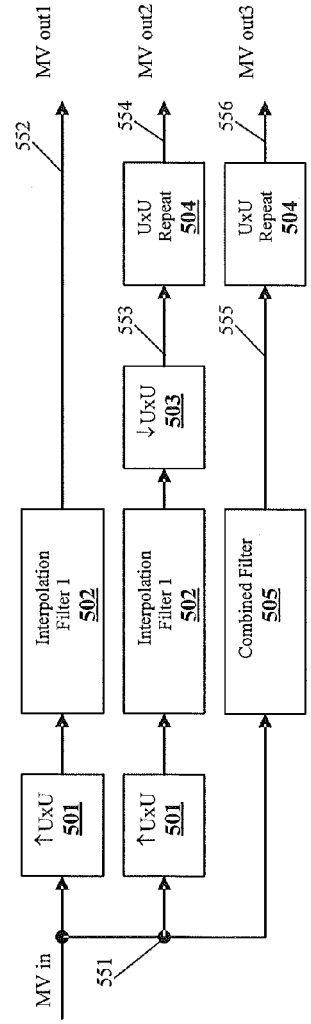
FIG. 5 illustrates a block diagram of a motion field interpolation according to some embodiments of the present invention.

FIG. 5 illustrates a comparison between three interpolation techniques. In FIG. 5, a MV 551 of reduced spatial resolution, which may be one of $F_{HR}(x)$ 461 or $B_{HR}(x)$ 362, is applied to three interpolation systems coupled in parallel. The systems provide respectively at their output MV out1 552, MV out2 554, and MVout3 556. Each MV output 552, 554, and 556 represents an interpolated MV field at a higher spatial resolution than input MV 551.

The first interpolation, which provides MV output 552, can be a classical configuration for a usual bi-dimensional (2D) interpolation by a factor of U×U. The interpolation is performed in up-converter 501. In the particular example where filters 303 and 304 decimate by 3×3, then U is equal to 3 from reduced HD to full HD format in the present two-level hierarchical decomposition. The interpolated MV from up-converter 501 is then input to filter 502. The filter response for filter 502, in some embodiments where U=3, can be given by $$(-3, -10, 0, 42, 99, 128, 99, 42, 0, -10, -3)/128, U=3. \quad (2)$$

The output signal from filter 502 is MV 552.

The second system, which provides MV 554, is the $1^{st}$ system followed by a decimation 303 by U×U and then, by an up-conversion 504 by U×U. Because the MV field is generally smooth, the MV 552 and MV 554 are nearly identical. For skilled people in the art, the U×U repetition is interesting at least for storage purpose.

The third system, which provides MV 556, combines up-converter 501, filter 502, and decimator 504 into a single filter 505. If the linear filter 502 impulse response for the interpolation by U=3 is given by Equation 2, then the combined filter 505 can be seen as a sub-filter in a polyphase system. In fact, it has been verified experimentally that the following unitary gain sub-filter response is suitable for U=3:

$$(-10, 99, 42, -3)/128, U=3 \quad (3).$$

The third system with filter 505 and U×U up-converter 504 can therefore be implemented in interpolator 308.

Similarly for the case U=2, if the filter 502 is given by:

$$(-10, 0, 74, 128, 74, 0, -10)/128, U=2 \quad (4)$$

then the unitary gain combined filter 505 is given by $$(-10, 74, 74, -10)/128 \; U=2. \quad (5)$$

Figure 6:
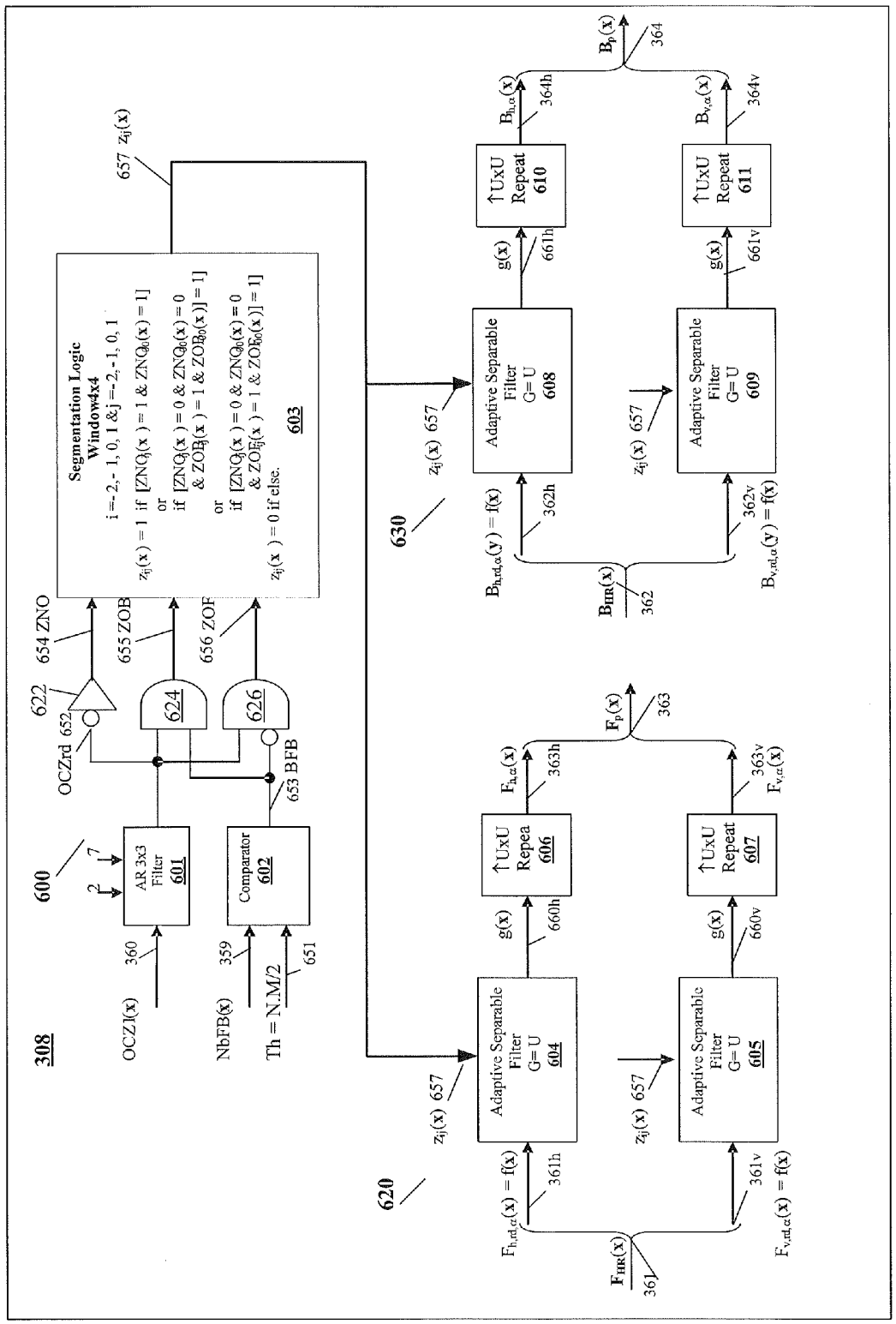
FIG. 6 illustrates a block diagram of an Occlusion based Adaptive Motion Field Interpolation according to some embodiments of the present invention.

FIG. 6 illustrates an embodiment of field interpolator 308 that considers the occlusion regions and also utilizes a simplified interpolation system as described in FIG. 5. Because linear filter interpolation of MV is not suitable for the surrounding occlusion regions, some embodiments utilize an occlusion based adaptive non linear motion field interpolation process as illustrated in FIG. 6. Such a process reduces the possible region of interference error. Interpolator includes an Occlusion-based Local Window Segmentation portion 600, adaptive interpolator 620, and adaptive interpolator 630. Adaptive Interpolations 620 and 630 interpolate the four components of $F_{HR}(x)$ 461 and $B_{HR}(x)$ 362.

The pixel-based signals OCZ1(x) 360, and NbFB(x) 359, from MVS 306 are input to segmentation portion 600. Precisely, OCZ1 360 is input to an AR Filter 601, and NbFB 359 to a Comparator 602. In some embodiments, AR filter 601 is a 3×3 filter.

Binary filter 601, which also may be an add-remove (AR) filter, consolidates the detected possible occlusion zone OCZ1(x) signal. In some embodiments, filter 601 can have a 3×3 window footprint. In filter 601, if N(x) is the count of OCZ1 360 in the 3×3 window around the central pixel x, then the output of filter 601, OCZrd(x) 652, can be given by $$OCZrd(x) = \begin{cases} 1, & \text{if } N(x) \geq ThH = 7 \\ OCZ1(x), & \text{if } ThL = 2 < N(x) < ThH = 7, \\ 0, & \text{if } N(x) \leq ThL = 2 \end{cases} \quad (6)$$

where ThL and ThH are threshold values input to filter 308. For the 3×3 example, for example, ThL may be 2 while ThH may be 7.

Comparator 602 inputs NbFB(x) and yields a binary output signal BFB(x) 653 defined as $$BFB(x) = \begin{cases} 1, & \text{if } NbFB(x) \geq Th = N.M/2 \\ 0, & \text{if } NbFB(x) < Th = N.M/2 \end{cases} \quad (7)$$

If N×M=7×9 as previously discussed, the threshold Th can be set equal to 32.

Binary signals OCZrd 652 and BFB 653 are then input to logical gates inverter 622, AND 624, and NAND 626 to provide the 3 exclusive signals Zone No-Occlusion (ZNO) 654, Zone of Backward MV (ZOB) 655, and Zone of Forward MV (ZOF) 656, respectively. As shown in FIG. 6, ZNO 654 is the inverse of OCZrd 652, ZOB 655 is given by (OCZrd 652 AND BFB 653), and ZOF 656 is given by (OCZrd 652 AND (NOT BFB 653)). These 3 pixel-based signals are used for a region-based binary segmentation of a local window.

Segmentation logic 603 then receives signals ZNO 654, ZOB 655, and ZOF 656 for each of the four components of OCZ 360 and NbFB 359. In FIG. 6, processing of only one of the four components of OCZ1 360 and NbFB 359 is illustrated. Because $F_{HR}(x)$ 361 or $B_{HR}(x)$ 362 include four values, the local logic window is of dimensions 4×4 and non symmetric around the considered pixel x. If the considered coordinates $x^T=(c, r)$, then, in the window, the pixel coordinates are given by (r+i, c+j), i=−2, −1, 0, 1 and j=−2, −1, 0, 1. In function of the regions of the considered pixel x, the binary segmentation result $z_{ij}(x)$, which is output from segmentation logic 603, can be defined by the following logic:

$z_{ij}(x)=1$, if $[ZNO_{ij}(x)=1 \; \& \; ZNO_{00}(x)=1]$ or if $[ZNO_{ij}(x)=0 \; \& \; ZNO_{00}(x)=0 \; \& \; ZOB_{ij}(x)=1 \; \& \; ZOB_{00}(x)]=1]$ or if $[ZNO_{ij}(x)=0 \; \& \; ZNO_{00}(x)=0 \; \& \; ZOF_1(x)=1 \; \& \; ZOF_{00}(x)]=1]$, $$z_{ij}(x)=0, \text{ if else.} \quad (8)$$

Explicitly, $z_{ij}(x)$ is set to be 1 if the pixel (c+i, r+j) and the considered pixel x are in the same region that is either ZNO 654, ZOB 655, or ZOF 656. The binary signal $z_{ij}(x)$ 657 is sent to the four adaptive filters 604, 605, 608, and 609 in adaptive interpolator 620 and adaptive interpolator 630.

Adaptive interpolators 620 and 630 illustrates the four interpolation block diagrams for the components of the two motion vectors $F_{HR}(x)$ 361 and $B_{HR}(x)$ 362, as denoted in FIG. 3. For clarity, the components of $F_{HR}(x)$ 361 and $B_{HR}(x)$ 462 can be defined, respectively, as:

$$F_{HR}(x)=(F_{h,rd,\alpha}(x), F_{v,rd,\alpha}(x)) \quad (9)$$

$$B_{HR}(x)=(B_{h,rd,\alpha}(x), B_{v,rd,\alpha}(x)) \quad (10)$$

In equations (9) and (10), the indices h and v denote, respectively, horizontal and vertical components of the motion vector, rd denotes reduced definition, and finally a corresponding to the interpolated image position. As shown in interpolator 620 of FIG. 6, $F_{HR}(x)$ 361 includes horizontal component $F_{h,rd,\alpha}(x)$ 361*h* and vertical component $F_{v,rd,\alpha}(x)$ 361*v*. Similarly, as shown in interpolator 630 of FIG. 6, $B_{HR}(x)$ 462 includes horizontal components $B_{h,rd,\alpha}(x)$ 362*h* and vertical component $B_{v,rd,\alpha}(x)$ 362*v*.

As shown in FIG. 6, $F_{h,rd,\alpha}(x)$ 361*h* is input to adaptive separable filter 604, $F_{v,rd,\alpha}(x)$ 361*v* is input to adaptive separable filter 605, $B_{h,rd,\alpha}(x)$ 362*h* is input separable filter 608, and $B_{v,rd,\alpha}(x)$ 362*v* is input to adaptive separable filter 609. The output signal from filter 604, g(x) 660*h*, is input to U×U repetition 606. The output signal from filter 605, g(x) 660*v*, is input to U×U repetition 607. The output signal from filter 609, g(x) 661*h* is input to U×U repetition 610. The output signal from filter 609, g(x) 661*v*, is input to U×U repetition 611. U×U repetition 606, 607, 610 and 611 provide for zooming. As shown in FIG. 6, U×U repetition 606 provides output $F_{h,\alpha}(x)$ 363*h* and U×U repetition 607 provides output $F_{v,\alpha}(x)$ 363*v*, which together form output $F_p(x)$ 363. Additionally, U×U repetition 610 provides output $B_{h,\alpha}(x)$ 364*h* and U×U repetition 611 provides output $B_{v,\alpha}(x)$ 364*v*, which together form output $B_p(x)$ 364. Preliminary motion vectors $F_p(x)$ 363 and $B_p(x)$ 364 are to be refined at the higher resolution level processing 391.

Since higher resolution images are U×U times bigger than previous low resolution images, each Adaptive Separable Filter 604, 605, 608 or 609 can have a gain G=U. If f(x)

represents generically a MV component applied at the input of one of respective Adaptive Separable Filters 604, 605, 608, or 609 and g(x) is the respective filter output, each of Adaptive Separable Filters 604, 605, 608, and 609 can be described by the following expression:

$$g(c,r) = U\Sigma_i\{E_j[h_ih_jz_{ij}(c,r)f(c-i, r-j)]/\Sigma_j[h_jz_{ij}(c,r)]\}/\Sigma_i[h_iz_{ij}(c,r)] \quad (11)$$

In the above expression, $h_k$ are the filter coefficients given in equations (3) or (5) for U=3 or U=2, respectively. As a particular example, for the case where U=3, values for $h_k$ can be given by $h_1=-10, h_0=99, h_{-1}=42$ and $h_{-2}=-3$, which correspond to the filter coefficients provided in Equation (3) above with the normalization provided in the numerator of Equation (11). Equation (11) shows that, via adaptive on/off weighting $z_{ij}(x)$, the filtering is applied only on MV component input at the pixels situated in the same region with the considered pixel.

Referring back to FIG. 3, the forward, backward ME and MV-Filter 305, MVS 306, MV-HR and D-LBOR 307, and Occlusion-based Adaptive Motion Field Interpolation 308 constitute a Low Level Processing 390. Some characteristics, images, or parameters produced at this level can be utilized for final image corrections. Some other parameters can be provided from High Level Processing 391. In order to simplify the drawings, these parameters are re-grouped in term of functionality Sets of Parameters denoted from SetPar1 to SetPar5, 371-375, and applied to Post Processors 312. These Sets of Parameters will be detailed while discussing the function of post processors 312 below.

As illustrated by FIG. 3, interpolated motion vectors $F_p(x)$ 363 and $B_p(x)$ 364 from low resolution level are now sent to pixel-based ME Refining (MER) 309 operating at the high resolution level. High resolution images $I_n(x)$ 351 and $I_{n-1}(x)$ 352 are also inputs to MER 309. Conventionally, motion refining involves estimating or selecting a motion vector within a search range of some immediate neighborhood of the motion compensated (MC) pixel position in the current level resolution, as was described in the classical 3-step search of Thoma & Bierling. However, in accordance with some embodiments of the present invention MER 309 selects a motion vector based on sum of absolute difference (SAD) calculations.

Figure 7:
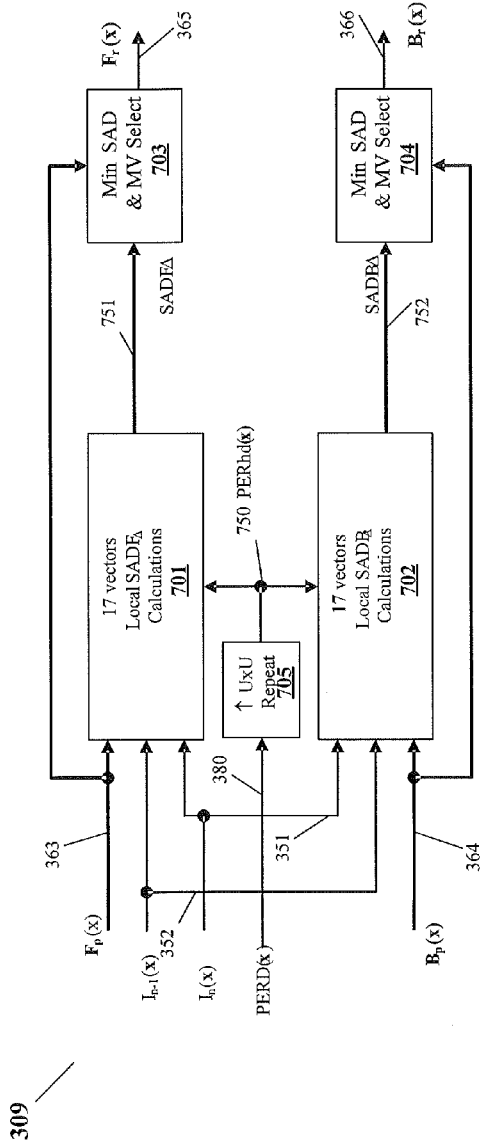
FIG. 7 illustrates a block diagram of Motion Estimation Refining according to some embodiments of the present invention.

FIG. 7 illustrates an embodiment of Motion Estimation Refining (MER) 309 for forward and backward motion vectors. As shown in FIG. 7, $I_n(x)$ 351, and $I_{n-1}(x)$ 352 are input to both calculation 701 and calculation 702. PERD(x) is input to repeater 705 for generation of the high level value PERhd(x) 750, which is then input to both calculations 701 and 702. Forward MV $F_p(x)$ 363 is input to calculation 701 and backward MV $B_p(x)$ 364 is input to calculation 702. The calculation 701 provides $SADF_\Delta$ values 751, which are applied to the selector 703 for Minimum SAD determination and corresponding forward MV selection. In some embodiments, $SADF_\Delta$ may be based on 17 vectors. Selector 703 outputs a refined forward MV denoted as $F_r(x)$ 365. Meanwhile, similar processing is used for preliminary backward MV input $B_p(x)$ 364. The processing is composed of $SADB_\Delta$ calculation block 702 followed by the Minimum SAD and MV selector 704. Selector 704 then outputs refined MV $B_r(x)$ 366. SADF and SADB calculations are further described below.

Calculation 701 and calculation 702 generates values SADF 751 and SADB 752, respectively. For a MV forward or backward, the search range is composed of two sets of MV. The first set is still MV in the neighborhood of the MC pixel position. However, the pixel position in the search range is not necessarily pixel adjacency, as in conventional systems, but is at a multiple factor of U, the previous low to current high level zooming factor. In some embodiments, for example, U=3. The purpose of this suggested first set of search range is to reduce the effect caused by possible erroneous MV estimated in low level 390 in occlusion regions, which are difficult to detect well. In other words, if MV was not truly reliable, it should be good to utilize the information of pixels far from the supposed-to-be-good pixel. Therefore, for economical reasons, the utilized first sets $S_{1F}$ and $S_{1B}$, respectively for forward MVs in calculation 701 and backward MVs in calculation 702, are composed of MV at nine pixel locations that can be defined by:

$$S_{1F} = \{F_{mp,nq} : p \& q = \pm 1, m = k*U\} \text{ and} \quad (11)$$

$$S_{1B} = \{B_{mp,nq} : p \& q = \pm 1, m = k*U\}, \quad (12)$$

in which k=2, in some embodiments.

The second set of MV in both calculation 701 and calculation 702 is used for providing a high precision in the ME. Contrary to conventional systems that utilize adjacent pixels of the current pixel, according to the present invention the second set is composed of eight MVs nearly equal to the current motion vector within some additional precision. Precisely, $S_{2F}$ and $S_{2B}$ respectively for forward motion vectors in calculation 701 and backward motion vectors in calculation 702 can be defined as the following:

$$S_{2F} = \{F_{0,0} + \lambda\Delta, \Delta=(\pm 1, \pm 1) \text{ except } (0, 0)\} \quad (13)$$

$$S_{2B} = \{B_{0,0} + \lambda\Delta, \Delta=(\pm 1, \pm 1) \text{ except } (0, 0)\}, \quad (14)$$

in which the used factor $\lambda$ can be set equal to 1 in some embodiments.

Since occlusion is not detected, the ME refining is completed further in a single optimization operation for both $S_1$ and $S_2$. Let $F_\Delta$ and $B_\Delta$ be forward and backward MV in the respective composed set:

$$F_\Delta \in S_{1F} \cup S_{2F} \quad (15)$$

in calculation 701 and $$B_\Delta \in S_{1B} \cup S_{2B} \quad (16)$$

in calculation 702. The MV selection criterion is based essentially on the MV minimizing the following 5×5 Sums of Absolute Difference, $SADF_\Delta$ in calculation 701 and $SADB_\Delta$ in calculation 702, respectively for forward and backward MV:

$$SADF_\Delta(x) = a_F\left(\sum_{k_h=-2}^{2}\sum_{k_v=-2}^{2}|I_n(x+k+\alpha F_\Delta) - I_{n-1}(x+k-(1-\alpha)F_\Delta)|\right) + b_F \quad (17)$$

$$SADB_\Delta(x) = a_B\left(\sum_{k_h=-2}^{2}\sum_{k_v=-2}^{2}|I_n(x+k-\alpha B_\Delta) - I_{n-1}(x+k+(1-\alpha)B_\Delta)|\right) + b_B \quad (18)$$

In the above equations, the coefficients a ($a_F$ or $a_B$) and b ($b_F$ or $b_B$) can be defined as follows $$a_F = 2, \text{ if } F_\Delta \in S_{2F} \& PER_{hd}(x) = 1; \quad (19a)$$

$$a_F = 1, \text{ if else}.$$

$$b_F = 1 \times 25, \text{ if } F_\Delta \in S_{2F} \& PER_{hd}(x) = 1; \quad (19b)$$

$$b_F = 0, \text{ if else}.$$

and $a_B=2$, if $B_\Delta \in S_{2B}$ & $PER_{hd}(x)=1$;  (20a)

$a_F=1$, if else.

$b_B=1\times25$, if $B_\Delta \in S_{2B}$ & $PER_{hd}(x)=1$;  (20b)

$b_B=0$, if else.

The above $PER_{hd}(x)$ 750 is the repeat U×U version of the detected periodic signal PERD(x) 380 that has been provided by ME and MV-Filter 305 at the low resolution level.

The two equations (17) and (18) provide image interpolations as a function of MV. In order to reduce the complexity, the image interpolation can be done with separable 2 taps filtering.

As shown in FIG. 7, $SADF_A$ 751 is input to select 703 and $SADB_A$ 752 is input to select 704. If there are two or more equal minimum $SADF_A$ 751, the selection of $F_r(x)$ 365 in select 703 can be determined by the highest priority among these minimum cases. Table 1 illustrates a priority table that can be utilized in some embodiments. In the table Max can be arbitrary chosen such as Max=17.

TABLE 1

Maximum priority for Forward Motion Vector

| $F_p(x)$ | Priority | $F_p(x)$ | Priority | $F_p(x)$ | Priority |
|---|---|---|---|---|---|
| $F_{0,0}(x)$ | Max | $F_{0,0}(x) +$ (−1, 0) | Max − 1 | $F_{0,0}(x) +$ (1, 0) | Max − 2 |
| $F_{0,0}(x) +$ (0, −1) | Max − 3 | $F_{0,0}(x) +$ (0, 1) | Max − 4 | $F_{0,0}(x) +$ (−1, −1) | Max − 5 |
| $F_{0,0}(x) +$ (1, 1) | Max − 6 | $F_{0,0}(x) +$ (−1, 1) | Max − 7 | $F_{0,0}(x) +$ (1, −1) | Max − 8 |
| $F_{-2U,0}(x)$ | Max − 9 | $F_{2U,0}(x)$ | Max − 10 | $F_{0,-2U}(x)$ | Max − 11 |
| $F_{0,2U}(x)$ | Max − 12 | $F_{-2U,-2U}(x)$ | Max − 13 | $F_{2U,2U}(x)$ | Max − 14 |
| $F_{-2U,2U}(x)$ | Max − 15 | $F_{2U,-2U}(x)$ | Max − 16 | | |

Similarly, if there are two or more equal minimum $SADB_A$ 752, the selection of $B_r(x)$ 366 in select 703 can be determined by the highest priority among these minimum cases. Table 2 illustrates a priority table that can be utilized. In the table Max can be arbitrary chosen such as Max=17.

TABLE 2

Maximum priority for Backward Motion Vector

| $B_p(x)$ | Priority | $B_p(x)$ | Priority | $B_p(x)$ | Priority |
|---|---|---|---|---|---|
| $B_{0,0}(x)$ | Max | $B_{0,0}(x) +$ (−1, 0) | Max − 1 | $B_{0,0}(x) +$ (1, 0) | Max − 2 |
| $B_{0,0}(x) +$ (0, −1) | Max − 3 | $B_{0,0}(x) +$ (0, 1) | Max − 4 | $B_{0,0}(x) +$ (−1, −1) | Max − 5 |
| $B_{0,0}(x) +$ (1, 1) | Max − 6 | $B_{0,0}(x) +$ (−1, 1) | Max − 7 | $B_{0,0}(x) +$ (1, −1) | Max − 8 |
| $B_{-2U,0}(x)$ | Max − 9 | $B_{2U,0}(x)$ | Max − 10 | $B_{0,-2U}(x)$ | Max − 11 |
| $B_{0,2U}(x)$ | Max − 12 | $B_{-2U,-2U}(x)$ | Max − 13 | $B_{2U,2U}(x)$ | Max − 14 |
| $B_{-2U,2U}(x)$ | Max − 15 | $B_{2U,-2U}(x)$ | Max − 16 | | |

As illustrated by FIG. 3, the refined MV $F_r(x)$ 365, $B_r(x)$ 366 and the existing images $I_n(x)$ 351 and $I_{n-1}(x)$ 352 are input to halo reduction 310 for MV based Halo Reduction (MV-HR). Except for the high resolution input signals and high resolution processing, MV-HR in halo reduction 310 is substantially identical to that described in FIG. 4 for halo reduction 307. Halo reduction 310 provides further corrections at borders of occlusion regions. The resulting MV, forward F(x) 367 and backward B(x) 368, are applied now for the high resolution motion compensated image interpolation HRMC 311.

Figure 8:
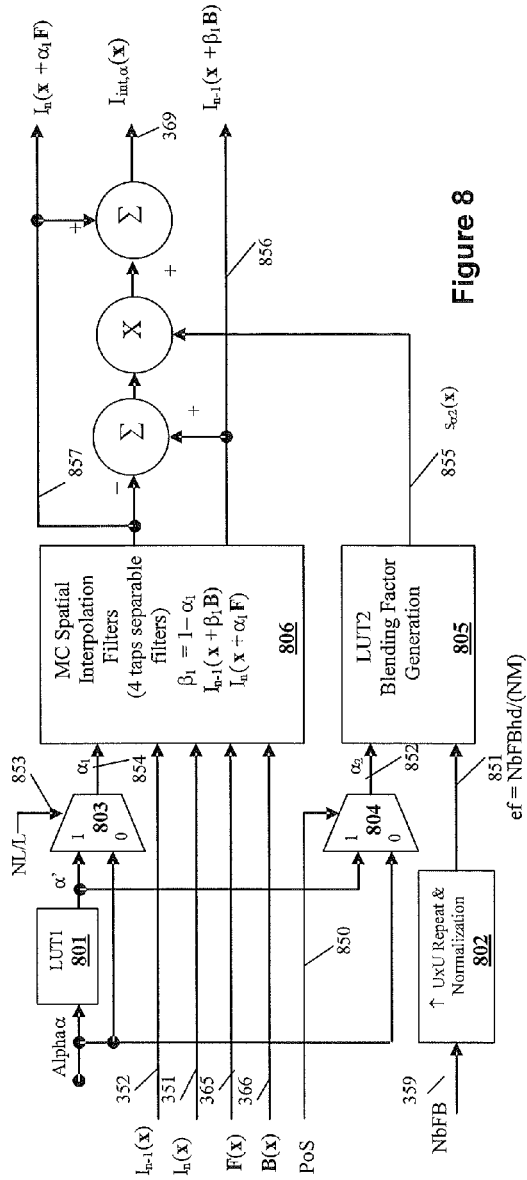
FIG. 8 illustrates a block diagram of High Resolution Motion Compensated Image Interpolation according to some embodiments of the present invention.

FIG. 8 illustrates an embodiment of HRMC 311 according to some embodiments of the present invention. HRMC 311 performs an adaptive motion compensated image interpolation with various additional features. As shown in FIG. 8, the parameter a is input to LUT1 801, which produces parameter α'. Parameters α and α' are input to multiplexers 803 and 804. Multiplexer 803 chooses between α and α' based on NL/L 853 to generate parameter $\alpha_1$ 854. Multiplexer 804 chooses between α and α' based on PoS 850 to produce $\alpha_2$ 852. Parameter $\alpha_1$ 854, along with image $I_{n-1}(x)$ 352, image $I_n(x)$ 351, forward motion vector F(x) 365, and backward motion vector B(x) 366, is input to MC spatial interpolation filters 806. Filter 806 produces images $I_n(x+\alpha_1 F)$ 857 and $I_{n-1}(x+(1-\alpha_1)B)$ 856. Meanwhile, parameter MbFB 359 is input to repeater 802, which provides a normalized high resolution parameter NvFBhd/NM 851. NvFBhd/NM 851 along with $\alpha_2$ 852 is input to LUT2 805, which provides blending factor $S_{\alpha 5}(x)$ 855.

As shown in FIG. 8, the interpolation can be given by $$I_{int,\alpha}(x)=I_n(x+\alpha_1 F)+s_{\alpha 2}(x) \cdot [I_{n-1}(x+(1-\alpha_1)B)-I_n(x+\alpha_1 F)].$$  (21)

In order to reduce further the halo effect without blurring the image, the adaptation can be a combination of various parameters or factors. In the previous expression, the controllable parameters $\alpha_1$ 854, $\alpha_2$ 852, and the blending factor $s_{\alpha 2}(x)$ 855 can provide an adaptive interpolation technique.

The parameter $\alpha_1$ can be defined as follows:

For linear MV mode: $\alpha_1 = \alpha$;  (22)

For nonlinear MV mode: $\alpha_1=2\alpha^2$, if $0 \leq \alpha \leq \frac{1}{2}$;  (23a)

$\alpha a_1=-1+4\alpha-2\alpha^2$, if $\frac{1}{2} \leq \alpha \leq 1$.  (23b)

LUT1 801 and multiplexer 803 are used to establish parameter $\alpha_1$ 854. LUT1 801, therefore, executes equation (23) to provide α', which is chosen in multiplexor 803 in nonlinear mode designated by input NL/L 853. In the nonlinear mode, the parameter $\alpha_1$ can provide a film look effect with little motion judders in some cases and always sharp images.

The parameter $\alpha_2$ 852 is provided independent of $\alpha_1$ and can be selected by Position Select PoS 850 in multiplexer 804.

If PoS=0, then $\alpha_2=\alpha$;  (24)

If PoS=1, then $\alpha_2=2\alpha^2$, if $0 \leq \alpha \leq \frac{1}{2}$;  (25a)

$\alpha_2=-1+4\alpha-2\alpha^2$, if $\frac{1}{2} \leq \alpha \leq 1$.  (25b)

LUT1 801 and the multiplexer 804 are used for the above definition realization, as shown in FIG. 8. In some embodiments, LUT1 801 can be implemented in a look-up table. The parameter $\alpha_2$ 852 is associated with the blending factor $s_{\alpha 2}(x)$. If PoS=1, the parameter $\alpha_2$ role is to provide a fictitious position of the interpolated image.

Figure 9:
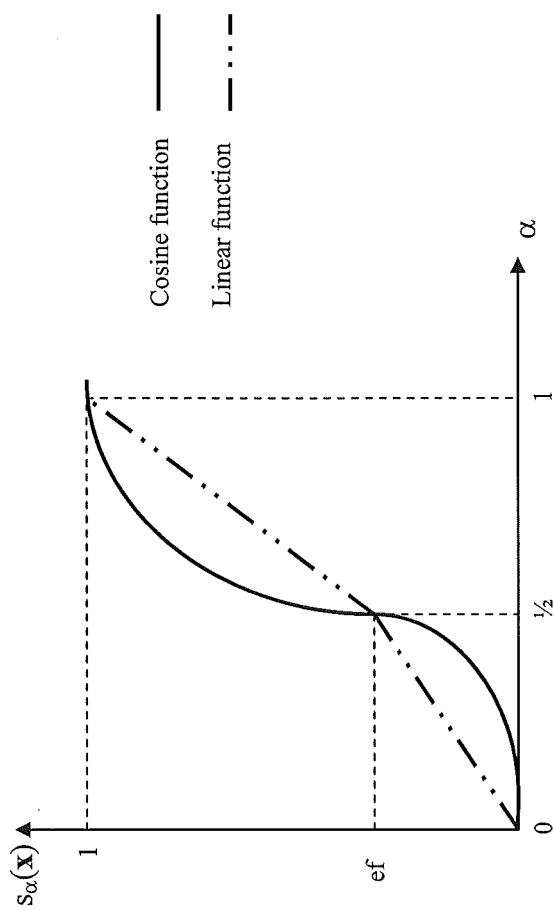
FIG. 9 illustrates a plot of a Blending Factor that can be utilized for Image Interpolation.

The blending signal $s_{\alpha 2}(x)$ 855 provided by the blending factor generation LUT2 805 is a generic increasing function of $\alpha_2$ as illustrated by FIG. 9. The function's purpose is to provide a continuous appearance when the interpolated image position is not far from existing images $I_n(x)$ or $I_{n-1}(x)$. This feature is useful when there are many images to be interpolated between the existing ones. In the middle position, $\alpha_2=\alpha=\frac{1}{2}$, the blending value becomes simply ef(x) defined as the normalized NbFBhd(x)/(NM) 851, which is normalized to window size N×M. NbFBhd(x) 851 is the up-sampled version of NbFB(x) in the previous level. As discussed above, NbFB(x) is the number of pixels, in a sliding window of dimension N×M, which are favorable to use backward MV applied from the past image $I_{n-1}(x)$. As shown in FIG. 8, the NbFB(x) signal 359 is applied to the U×U Repeat and Normalization 802 to provide the signal ef(x) 851, which is input in turn to LUT2 805.

There are many possibilities to create an increasing blending function using the above principle. FIG. 9 illustrates a cosine and a linear function, but other smooth functions can be utilized as well. In some embodiments LUT2 805 can be a versatile look-up table that can generate one of the following functions $s_{\alpha 2}(x)$ 855:

Cosine function: If $1 > \alpha_2 \geq \frac{1}{2}$, $s_{\alpha 2}(x) = (1-ef(x)) \cdot \cos[\pi(1-\alpha_2)] + ef(x)$; (26a)

If $\frac{1}{2} \geq \alpha_2 > 0$, $s_{\alpha 2}(x) = ef(x) \cdot \cos[\pi(1-\alpha_2)] + ef(x)$. (26b)

Linear function: If $1 > \alpha 2 \geq \frac{1}{2}$, $s_{\alpha 2}(x) = (1-ef(x)) \cdot \alpha_2 + (-1 + 2 \cdot ef(x))$; (27a)

If $\frac{1}{2} \geq \alpha_2 > 0$, $s_{\alpha 2}(x) = ef(x) \cdot \alpha_2$. (27b)

FIG. 8 illustrates also the implementation of the interpolation equation (21) can be done in two steps. The first step consists of a MC spatial interpolation 806 with separable 4-taps filters, to provide at the output two MC images $I_n(x+\alpha_1 F)$ 857 and $I_{n-1}(x+(1-\alpha_1)B)$ 856. The second step consists of appropriately connected adders and multiplier as illustrated to yield the MC interpolated image $I_{int,\alpha}(x)$ 369 output signal. NL/L 853 represents an end-user control switch to select the linear or nonlinear modes governed by equations (22) and (23). Meanwhile, Position Select (PoS) 850 indicates an end-user selection of the true or ficticous position of the interpolated plan.

Referring to FIG. 3, the interpolated image $I_{int,\alpha}(x)$ 369 is input to Post Processors (PP) 312. In some embodiments, PP 312 provides for the correction of remaining special artifacts, which are not modeled or corrected by previous ME, MC or Halo Reduction HR.

Figure 10:
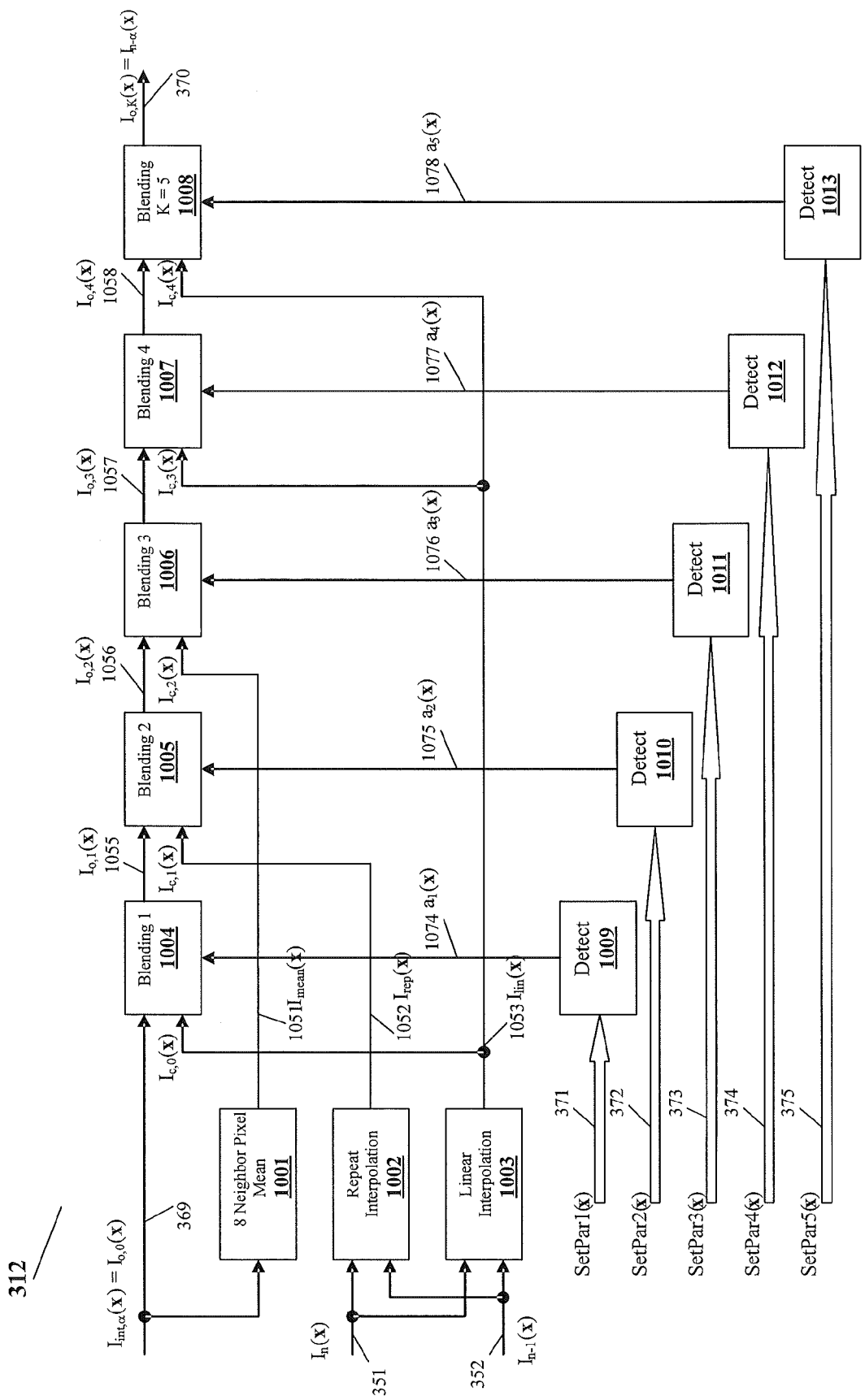
FIG. 10 illustrates a block diagram of post processors coupled in series according to some embodiments of the present invention.

FIG. 10 illustrates an example of PP 312. As may be observed from FIG. 10, PP 312 can be of low latency and of high versatility in that the addition of new corrections can be added as needed. The image inputs of the PP are the previous MC interpolated image $I_{int,\alpha}(x)$ 369 and the two existing images $I_n(x)$ 351 and $I_{n-1}(x)$ 352. As a function of the corrections being performed, these images are used to provide via blocks 1001, 1002 1003 some simple but effective corrected images.

The 8-neighbor pixels mean 1001 yields an image $I_{mean}(x)$ 1051 in which a considered pixel is substituted by the average value of the 8-neighbor pixels. It can be defined as follows:

$$I_{mean}(x) = (\Sigma_i \Sigma_j I_{int,\alpha}(x))/8, i,j=-1, 0, 1 \& (i,j) \neq (0,0) \quad (28)$$

This correction can be utilized when an interpolated pixel is detected as isolated or out of context.

The repeat interpolation 1002 is used to provide the interpolated image $I_{rep}(x)$ 1052 by the nearest existing image, that is:

$$I_{rep}(x) = I_n(x) \quad \text{if } \alpha \leq \frac{1}{2}, \quad (29a)$$
$$= I_{n-1}(x) \quad \text{if } \alpha > \frac{1}{2}. \quad (29b)$$

$I_{rep}(x)$ 1052 can be utilized for local blending in order to avoid possible broken lattice or periodic structure which is presented in image.

The linear interpolation 1003 yields, in turn, $I_{lin}(x)$ 1053, which can be used as a possible corrected image when motion is relatively small or the picture is relatively still. Linear interpolated image $I_{lin}(x)$ 1053 can be given by:

$$I_{lin} = I_n(x) + \alpha[I_{n-1}(x) - I_n(x)]. \quad (30)$$

The embodiment of PP 312 shown in FIG. 10 includes K=5 corrections coupled in series via blending techniques 1004 to 1008, although any number of corrections can be provided. For the $k^{th}$ blending, k being between 1 and 5, two images inputs are provided to the appropriate one of blending techniques 1004 to 1008; the previous blended output $I_{o,k-1}(x)$ and the correction image for detected default $2^{nd}$ one $I_{c,k-1}(x)$. The $k^{th}$ blending provides the corresponding output $I_{o,k}(x)$. The blending descriptive equation, which is implemented in each of blendings 1004 through 1008, is written as follows:

$$I_{o,k}(x) = I_{o,k-1}(x) + a_k(x)[I_{c,k-1}(x) - I_{o,k-1}(x)]. \quad (31)$$

The PP image input $I_{o,0}(x)$ 369 is also the MC interpolated image $I_{int,\alpha}(x)$ 369. The PP image output $I_{o,K}(x)$ 370 is the final interpolated and corrected image $I_{n-\alpha}(x)$ 370 for the geometric position α between frames n-1 and n. The $I_{c,k-1}(x)$ image input is chosen between $I_{mean}(x)$, $I_{rep}(x)$ and $I_{lin}(x)$ given by Equations (28), (29), and (30) as appropriate for the fault to be corrected.

Furthermore, in equation (31), $a_k(x)$ is the related blending factor, $0 \leq a_k(x) \leq 1$. The values $a_k(x)$ 1074-1078 are determined by a corresponding detection 1009-1013. In some embodiments of the invention, detection 1009, which provides blending factor $a_1(x)$ 1074 to blending 1004, detects Halos in Lattice Background; detection 1010, which provides blending factor $a_2(x)$ 1075, is a lattice post-processing detector; detection 1011, which provides blending factor $a_3(x)$ 1076, detects outlying pixels; detector 1012, which provides blending factor $a_4(x)$ 1077, detects unaligned MV; and detector 103, which provides blending factor $a_5(x)$ 1078, detects for still background and temporal grading.

As shown in FIG. 10, blending 1004 receives blending factor $a_1(x)$ 1074 from detector 1009, $I_{lin}(x)$ 1053 from linear interpolation 1003, and image $I_{int,\alpha}(x) = I_{o,0}(x)$ 369 and provides corrected image $I_{o,1}(x)$ 1055 according to Equation (31). Blending 1005 receives blending factor $a_2(x)$ 1075 from detector 1010, $I_{rep}(x)$ 1052 from repeat interpolation 1002, and image $I_{o,1}(x)$ 1055 and provides corrected image $I_{o,2}(x)$ 1056 according to Equation (31). Blending 1005 receives blending factor $a_3(x)$ 1076 from detector 1011, $I_{mean}(x)$ 1051 from pixel mean 1001, and image $I_{o,2}(x)$ 1056 and provides corrected image $I_{o,3}(x)$ 1057 according to Equation (31). Blending 1007 receives blending factor $a_4(x)$ 1077 from detector 1012, $I_{lin}(x)$ 1053 from linear interpolation 1003, and image $I_{o,3}(x)$ 1057 and provides corrected image $I_{o,4}(x)$ 1058 according to Equation (31). Blending 1007 receives blending factor $a_5(x)$ 1078 from detector 1013, $I_{lin}(x)$ 1053 from linear interpolation 1003, and image $I_{o,4}(x)$ 1058 and provides corrected image $I_{o,5}(x) = I_{n-\alpha}(x)$ 370 according to Equation (31). As is shown in FIG. 10 and FIG. 3, SetPar1(x) 371, SetPar2(x) 372, SetPar3(x) 373, SetPar4(x) 374, and SetPar5(x) 375 that are input to detect 1009, detect 1010, detect 1011, detect 1012, and detect 1013, respectively, are provided from low level processing 390 or high level processing 391 of FRC 300.

Figure 11:
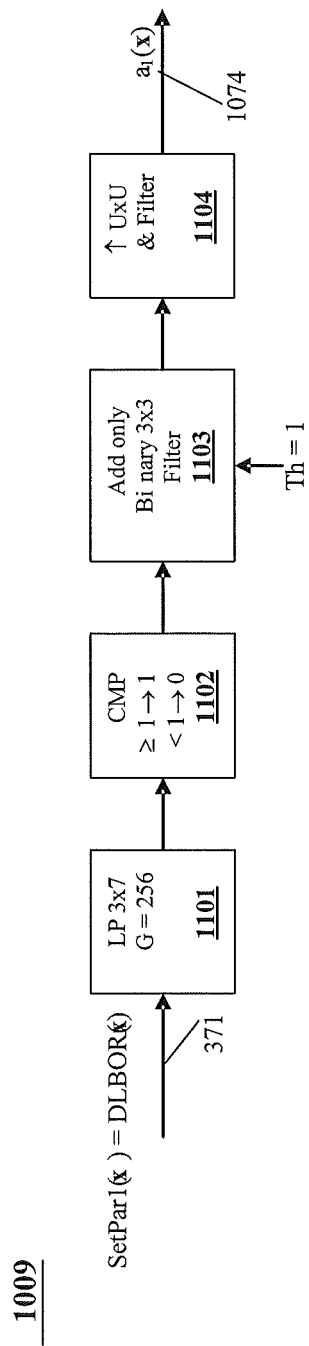
FIG. 11 shows a block diagram of Halo in Lattice Background Detection according to some embodiments of the present invention.

FIG. 11 illustrates detect 1009, which is directed to Halo in the Lattice Background. As is shown in FIG. 11, SetPar1(x) 371 is DLBOR(x) 371, which is generated by HR-DLBOR 307. The binary signal DLBOR(x) 371 is composed of small groups of pixels at the low resolution level. DLBOR(x) 371 is then input to low-pass 3×7 filter 1101 of large gain, for example G=256. The results are input to comparator 1102, which has a low threshold. The output signal from comparator 1102 is then input to binary filter 1103, can be a 3×3 binary filter. The output signal from filter 1103 is then input to up-resolution conversion U×U and filter 1104. In some embodiments, 3×7 filter 1101 can be characterized by the following impulse response:

$$\begin{bmatrix} 5 & 10 & 15 & 20 & 15 & 10 & 5 \\ 6 & 12 & 18 & 24 & 18 & 12 & 6 \\ 5 & 10 & 15 & 20 & 15 & 10 & 5 \end{bmatrix}, \quad (32)$$

which is a modified version of maximum flat binomial 1D filter.

If b(x) is the output signal from binary one-zero filter 1102, and defining a window P×Q (the filter dimension) around the pixel coordinates x=(c, r), then the Add-only binary one-zero filter 1103 signal output s(x) can be given by:

$$s(x) = 1, \quad \text{if } \sum_i \sum_j b(c+i, r+j) \leq Th, (i, j) \text{ in the window;} \quad (33a)$$

$$s(x) = b(x), \quad \text{if else.} \quad (33b)$$

For the present case, Th=1 for region enlarging.

Comparator 1102 provides a positive result of S(x)≧1. Up resolution conversion U×U and filter 1104 is similar to other filters that have been previously discussed, for example repeater 705 of FIG. 7.

Binary filters such as binary filter 1103 are used in various places in the post processors. There are several variations that can be utilized. For example, Add-only binary filter 1103 can be generalized into an Add and Remove (AR) binary filter. If b(x) is the output signal from binary one-zero filter 1102, and defining a window P×Q (the filter dimension) around the pixel coordinates x=(c, r), then AR binary filter 1104 signal output s(x) can be given by:

$$s(x) = 1, \quad \text{if } \sum_i \sum_j b(c+i, r+j) \leq ThB, (i, j) \text{ in the window;} \quad (34a)$$

$$s(x) = 0, \quad \text{if } \sum_i \sum_j b(c+i, r+j) \geq ThS, (i, j) \text{ in the window;} \quad (34b)$$

$$s(x) = b(x), \quad \text{if else.} \quad (34c)$$

For the AR filter case, ThS<ThB. The small threshold ThS is smaller than the big one ThB. Similarly, the Remove only filter for filter 1103 can be defined by:

$$s(x) = 0, \quad \text{if } \sum_i \sum_j b(c+i, r+j) \geq Th, (i, j) \text{ in the window;} \quad (35a)$$

$$s(x) = b(x), \text{if else.} \quad (35b)$$

Referring now to FIG. 10, blending 1005 (Blending 2) applies a correction in the interpolated image over areas containing lattice structures that are prone to generating image interpolation artifacts and have a relatively low motion velocity. The correction itself involves the replacement of interpolated image pixels by pixels of the nearest original image (frame repeat). Blending 1005 is controlled by detect 1010 (Detect 2), which is described in more detail in FIG. 12.

Detect 1010 has the role of detecting regions of lattice structures that are prone to showing image interpolation artifacts and have a low displacement value. The detected periodic structure may be horizontal, vertical, or both.

Figure 12:
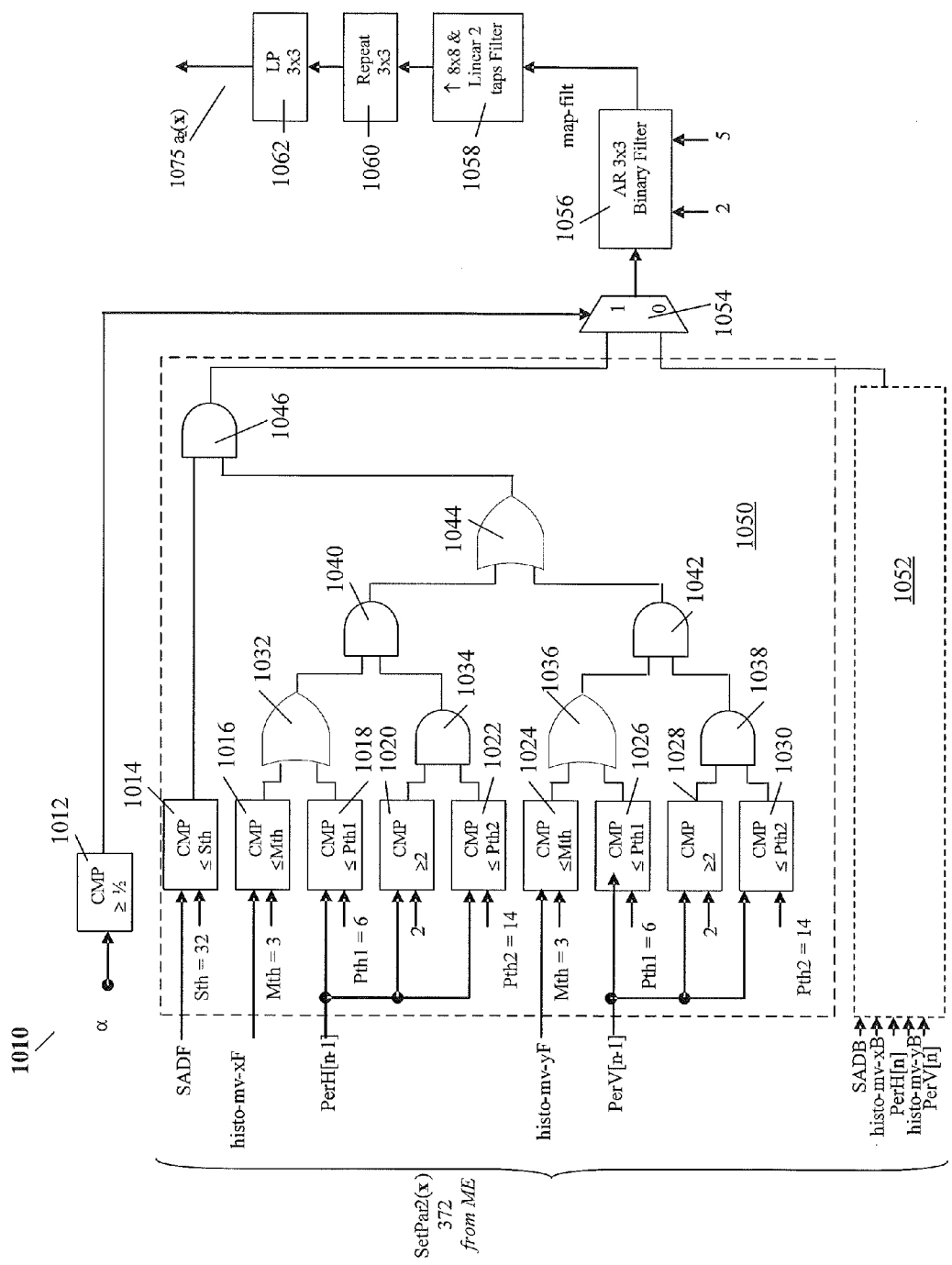
FIG. 12 shows a block diagram of Lattice Post Processing Detection according to some embodiments of the present invention.

The SetPar2(x) signal 372 for Lattice Post Processing Detection illustrated in FIG. 12 is composed of various signals provided by ME 305. As described in U.S. Publication 2009/0161763, ME filter can also generate periods of horizontal periodic structures PerH[n-1] or PerH[n], histograms of the horizontal component of the motion vectors histo-mv-xF or histo-mv-xB of a 2-D motion vector, periods of the vertical periodic structures PerV[n-1] or PerV[n], and histograms the vertical component histo-mv-yF or histo-mv-yB of the 2-D motion vector. PerH[n-1] and PerH[n] can be coupled with histo-mv-xF and histo-mv-xB while PerV[n-1] and PerV[n] can be coupled with histo-mv-yF and histo-mv-yB. A sum of absolute differences (SADF and SADB) is also calculated in ME 305.

As shown in FIG. 12, the parameter α is input to comparator 1012, which provides a logic 1 if α is greater than or equal to ½. The output result from comparator 1012 is input to multiplexer 1054 and utilized to choose between the signal from determination 1050 or determination 1052. Determination 1050 and determination 1052 have the same form, therefore determination 1050 is fully displayed in FIG. 12. Determination 1052 is identical with different inputs, as shown. As shown, determination 1050 receives parameters SADF, histo-mv-xF, PerH[n-1], histo-mv-yF, and PerV[n-1]. In their place, determination 1052 receives parameters SADB, histo-mv-xB, PerH[n], histo-mv-yB, and PerV[n], respectively.

Parameter SADF is input to comparator 1015 where it is compared with parameter Sth. Comparator 1015 outputs a logic high when SADF is less than or equal to Sth. In some embodiments, Sth can be 32. Similarly, comparator 1016 provides a logic high if histo-mv-xF is less than or equal to Mth, which in some embodiments may be 3. Comparator 1018 provides a logic high if PerH[n-1] is less than Pth1, which in some embodiments may be 6. Comparator 1020 provides a logic high if PerH[n-1] is greater than or equal to 2. Comparator 1022 provides a logic high if PerH[n-1] is less than or equal to Pth2, which in some embodiments can be 14. Comparator 1024 provides a logic high if histo-mv-yF is less than or equal to Mth, which in some embodiments can be 3. Comparator 1026 provides a logic high if PerV[n-1] is less than or equal to Pth1, which as above may be 6 in some embodiments. Comparator 1028 provides a logic high if PerV[n-1] is greater than or equal to 2. Comparator 1030 provides a logic high of PerV[n-1] is less than or equal to Pth2, which as above may be 14 in some embodiments.

The output signals from comparators 1016 and 1018 are input to OR gate 1032. The output signals from comparators 1020 and 1022 are input to AND gate 1034. The output signals from comparators 1024 and 1026 are input to OR gate 1036. The output signals from comparators 1028 and 1030 are input to AND gate 1038. The output signals from OR gate 1032 and AND gate 1034 are input to AND gate 1040. The outputs from OR gate 1036 and AND gate 1038 are input to AND gate 1042. The outputs from AND gate 1040 and AND gate are input to OR gate 1044. The output from OR gate 1044 is input to AND gate 1046 along with the output from comparator 1014.

The output from multiplexer 1054 is input to binary filter 1056, which can be an AR 3×3 binary filter AR binary filter is similar to filter 1103 and described by Equations (34) above. The output from binary filter 1056 Is input to linear filter 1058, which may be an 8×8 up-conversion with a linear two-tap filter. The output signal from filter 1058 is then input to repeat 1060. The output from repeat 1060 is filtered by LP 1062 to produce $a_2(x)$ 1075. The last 3×3 linear filter LP 1062 which is composed simply of separable 3-taps filters smoothes the blending 1005 transition In order for the applied correction to be relatively seamless, the motion velocity corresponding to the detected lattice structure should be small. Since the correction involves frame-repeat at only specific areas of an image, motion around the corrected area should also be small. This seamlessness is improved by filtering the correction map to feather the transitions.

For a lattice area to be prone to interpolation artifacts, the block-based motion estimation sum-absolute-difference (SAD) value (SADF or SADB) over that region should be relatively small, indicating that the motion estimator is finding a better than usual match, which usually involves a motion vector component that represents the true motion but also has a period multiple added to it, making it false and causing image interpolation artifacts in those areas.

For motion values to be reliable, the block-based motion vectors can not be directly used since they may be erroneous in those regions. Therefore a period-classified motion vector histogram (histo-mv-xF and histo-mv-yF) is utilized to indicate what the most probable motion value is over a periodic structure containing a certain period value. The histogram has gathered motion vectors for different period values of lattice structure in the previous frames and is usually more reliable.

It is possible to use this type of information to make different types of decisions on whether a correction should be applied or not. For example, if a period (PerH or PerV) is smaller than 6 pixels in low resolution, a correction could be applied regardless of the motion value for such lattices.

Figure 13:
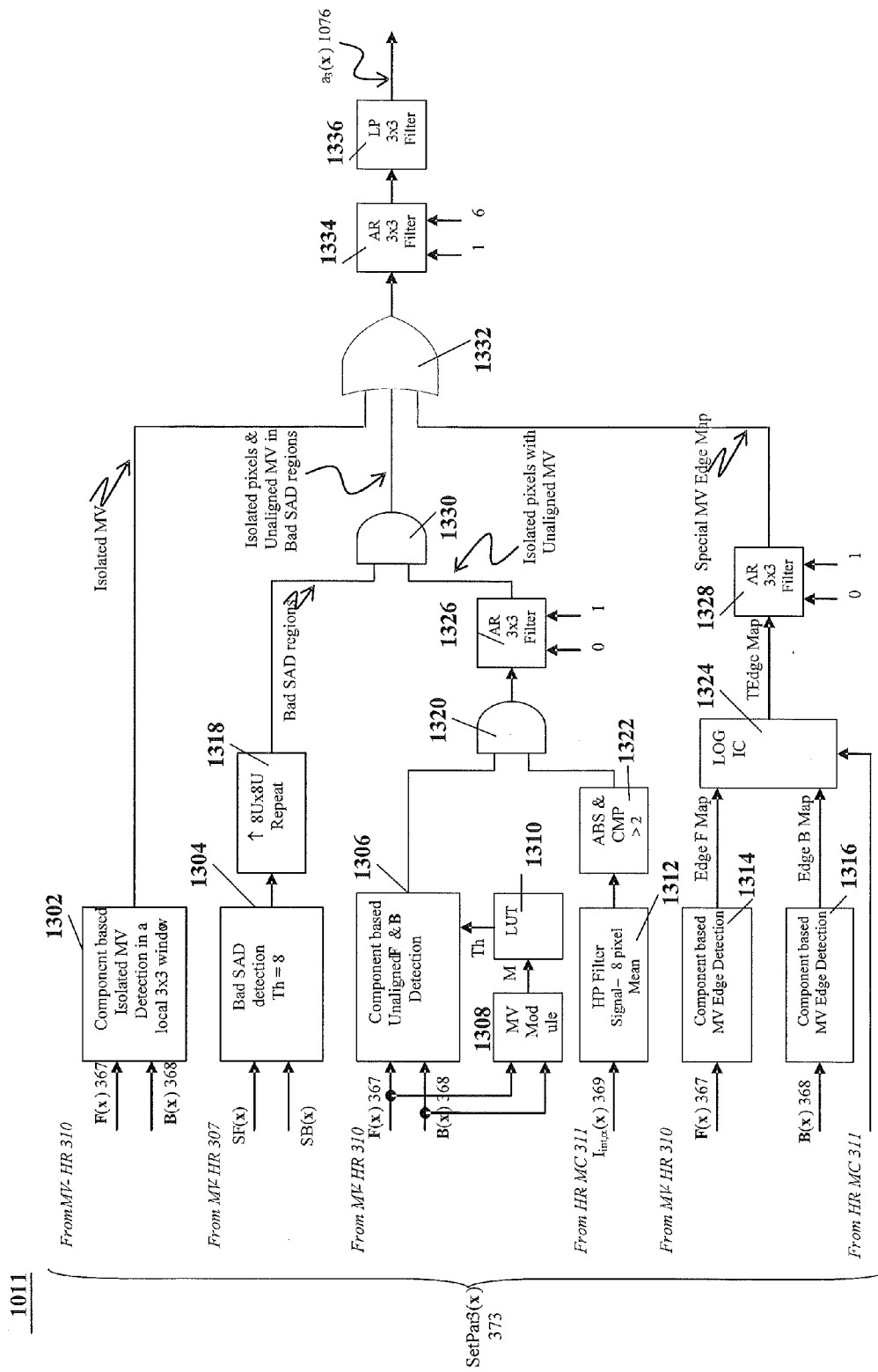
FIG. 13 shows a block diagram of Post Processing Detection according to some embodiments of the present invention.

FIG. 13 illustrates Post-Processing Detection 1011. The corresponding SetPar3(x) 373 is provided from Low level MV-HR 307, High Level MV-HR 310 and the HR-MC 311. In particular, as shown in FIG. 13 SetPar3(x) 373 includes F(x) 367 and B(x) 368 generated by MV-HR 310, SF(x) and SB(x) generated by MV-HR 307, $I_{int,\alpha}(x)$ 369 and NbFbhd(x) 359 generated by HR-MC 311. Post-Processing detection 1011 detects a combination of the three following events: Isolated MV, Isolated pixel with Unaligned MV in a Bad SAD regions, and Special MV Edge Map.

Isolated MV is defined as the pixel position at which any one of four components $F_h$, $F_v$, $B_h$ and $B_v$ does not have three or more similar values within a threshold, for example ±1, within a local sliding window, for example of size 3×3.

Isolated pixel with Unaligned MV in Bad SAD regions are defined as the pixel positions at which (1) the interpolated pixel intensity is different from its 8-neighbor mean, (2) one of the absolute sums abs($F_h+B_h$) or abs($F_v+B_v$) is bigger than some threshold value, and (3) one of the forward or backward MV normalized-SAD provided from ME is also bigger than a set threshold value.

As shown in FIG. 13, F(x) 367 and B(x) 368 are input to isolated MV detection 1302. Isolated MV detection detects whether a particular MV is within a threshold intensity of its eight-neighbor mean. In some embodiments, for example, the intensity threshold may be 2 in an 8-bit image.

SF(x) and SB(x) generated by MV-HR 307, which are the pixel-based values of SADF and SADB generated in MV-HR 307, are input to Bad SAD detection 1304. Each of SF(x) and SB(x) is then compared with the threshold value and, if the value is greater than the threshold, a bad SAD is identified. For example, in some embodiments the SAD threshold can be set to 8. The output from BAD detection 1304 is then input to repeater 1318 for up-conversion to a high resolution designation. Repeater 1318 utilizes an 8U×8U up-conversion.

As shown in FIG. 13, F(x) 367 and B(x) 368 generated by MV-HR 310 are input to un-alignment detection 1306. F(x) 367 and B(x) 368 are input to MV module 1308 to determine M, which in turn determines the aligning threshold Th. The MV aligning threshold Th is a function of MV module M and the HD resolution. The used MV module M can be defined as $$M = \max(|F_h|, |F_v|, |B_h|, |B_v|) \qquad (36)$$

In MV Module 1308. The value M is then input to LUT 1310. In some embodiments, The MV threshold Th utilized in un-alignment detector 1306 can be given by the LUT (Look up Table) shown in Table 3 in LUT 1310 for resolutions HD-720 and HD-1080. Other resolutions will have other look-up tables to determine the thresholds.

TABLE 3

MV Aligning Threshold LUT

| HD-720 | HD-1080 |
|---|---|
| Th = 2 if $0 \leq M \leq 8$ | Th = 3 if $0 \leq M \leq 12$ |
| Th = 4 if $8 < M \leq 18$ | Th = 6 if $12 < M \leq 27$ |
| Th = 6 if $18 < M \leq 32$ | Th = 9 if $27 < M \leq 48$ |
| Th = 8 if $32 < M \leq 48$ | Th = 16 if $48 < M \leq 72$ |

The threshold is then input to unalignment detection 1306, which compares the absolute sum of $F_v+B_v$ and $F_h+B_h$. If either of these sums are greater than the threshold value determined in LUT 1310, then a positive indication of unalignment is provided.

Further, $I_{int,\alpha}(x)$ 369 is input to HP filter 1312, which provides an eight-pixel mean to comparison 1322. Another positive indication of misalignment is provided by comparison 1322 of the value of $I_{int,\alpha}(x)$ 369 with the eight-pixel mean. In some embodiments, for example, if the absolute difference between $I_{int,\alpha}(x)$ 369 and the corresponding mean is greater than 2 a positive indication results.

The output from unaligned detection 1306 and comparison 1322 are input to AND 1320, which provides a positive result if both indications are positive. The results from AND 1320 are input to AR filter 1326. AR filter 1326 is similar to binary filter 1103 and described by Equation (34) above.

The third component is the special MV edge map. The Special MV Edge Map is defined as the component-based MV border pixel position for which the blind use of estimated forward or backward MV can result in some visible artifacts. MV Edge are based on the well known Sobel Compasses for each of the two components ($F_h$, $F_v$) in the case of forward MV F(x) and ($B_h$, $B_v$) for backward MV B(x). As shown in FIG. 13, F(x) 367 is input to component based MV edge detection 1314 and B(x) 368 is input to component based MV edge detection 1316. MV edge detection 1314 and edge detection 1316 produce binary one-zero edge maps by comparison of the components ($F_h$, $F_v$) and ($B_h$, $B_v$) with a suitable threshold.

Fmap from detection 1314 and Bmap from detection 1316 are input to logic 1324 for determination of a temporary edge map TedgeMap. The temporary edge map TedgeMap is a combination of the 2 edge maps, for example by execution of the following test in logic IC 1324:

If (*NbFBhd*$\leq$16) and (*F*map==1) TedgeMap=1      (37a)

else if (*NbFBhd*$\geq$48) and (*B*map==1) TedgeMap=1      (37b)

else

TedgeMap=0      (37c)

TedgeMap is then input to AR filter 1328, which is similar to binary filter 1103 and described by Equation (34) above, to provide MF edge map to OR gate 133.

The three events, Isolated MV from detection 1302, Isolated pixel with Unaligned MV in Bad SAD regions from AND 1330, and Special MV Edge Map from AR filter 1328 are combined together via OR gate 1332 followed by an AR binary filter 1334, which is similar to binary filter 1103 and described by Equation (34), for decision consolidation. Finally, a simple LP 3×3 separable filter 1336 for soft mixing provides the filtered correction map $a_3(x)$ 1076, which is sent to Blending 1006 for application.

Figure 14:
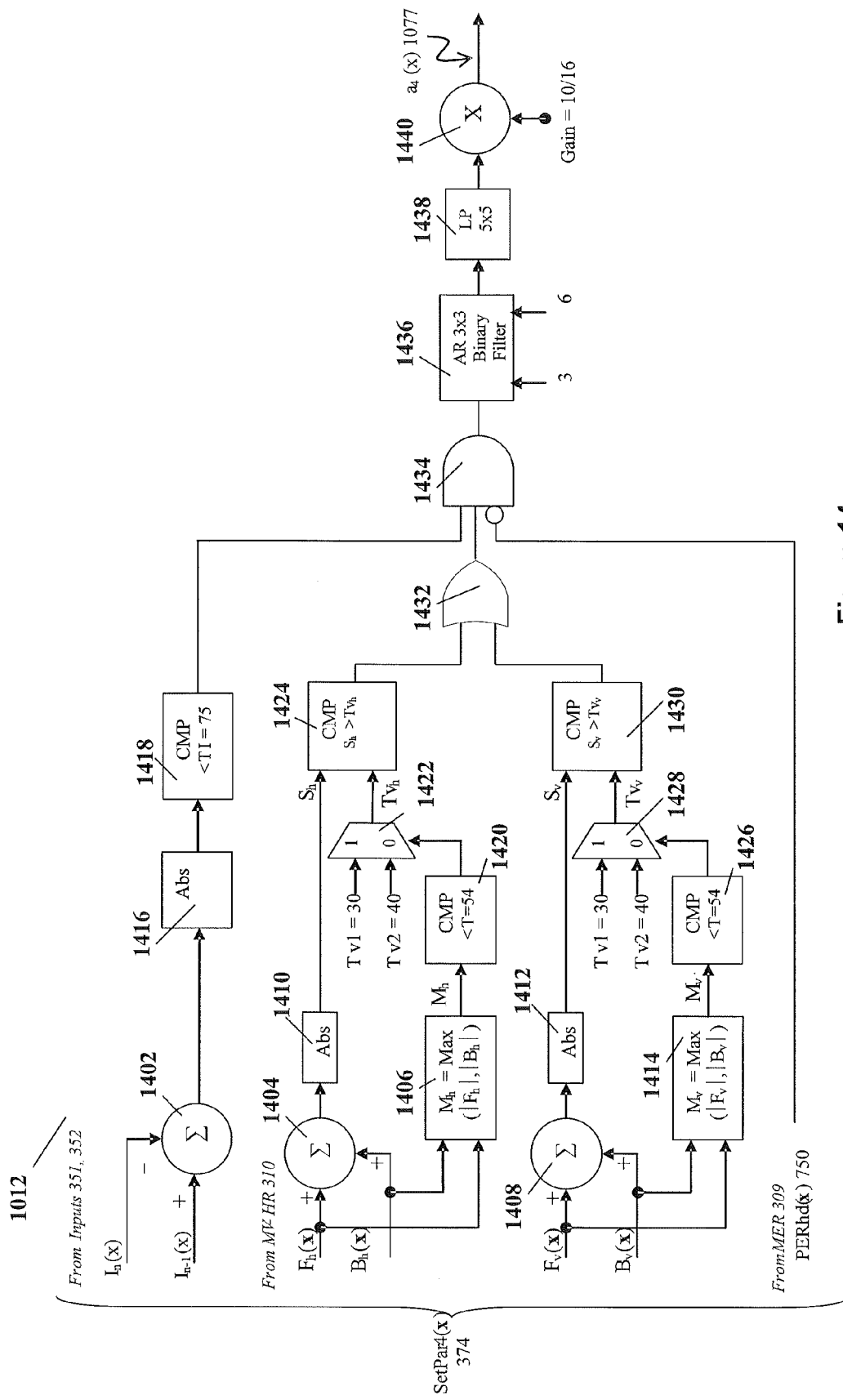
FIG. 14 shows a block diagram of Unaligned MV Detection according to some embodiments of the present invention.

FIG. 14 illustrates an embodiment of detector 1012, which provides parameter $a_4(x)$ 1077 to blending 1007. As discussed above, detection 1012 is an MV Unaligned Detection. The corresponding SetPar4(x) 374 is provided from the 2 input images $I_n(x)$ 351 and $I_{n-1}(x)$ 352, the MV F(x) 367 and B(x) 368 from MV-HR 310, and the PERhd(x) 750 from MER 309. The present MV Unaligned Detection is less restrictive than that utilized in detection 1011 and is one specific for isolated pixels in the relatively fixed zone, but is non periodic from the two input images.

As shown in FIG. 14, the difference between $I_n(x)$ 351 and $I_{n-1}(x)$ 352 is determined in summer 1402 and the absolute value of the difference provided in abs 1416. Comparator 1418 provides a positive result if the absolute value of the sum of $I_n(x)$ 351 and $I_{n-1}(x)$ 352 is less than a threshold, which in some embodiments may be 75.

The sum of $F_h(x)$ and $B_h(x)$ is determined in sum 1404 and the absolute value taken in abs 1410 The sum is provided to comparator 1424, which provides a positive result if the sum is greater than a threshold $T_{Vh}$.

Similarly, the sum of $F_v(x)$ and $B_v(x)$ is determined in summer 1408 and the absolute value of the sum provided in abs 1412. The absolute value of the sum is provided to comparator 1430, which provides a positive result if the sum is greater than a threshold $T_{Vv}$. The above described summer 1404 as well as the summer 1408 are used to test the alignment of the forward or backward MV F(x) and B(x).

As shown in FIG. 14, a value $M_h$ is set as the maximum of the absolute value of $F_h$ and $B_h$ in calculation 1406. Similarly, a value $M_v$ is set by calculation 1414. The MV Unaligned Detection technique is similar to the previous except the MV module. In this detection, the MV modules are component-based and therefore, as indicated above, calculations 1406 and 1414 provide values $M_h$ and $M_v$, respectively, evaluated as follows $$M_h = \max(|F_h|, |B_h|), \quad (38a)$$

$$M_v = \max(|F_v|, |B_v|). \quad (38b)$$

The values of Mh and My from calculations 1406 and 1414 are input to comparitors 1420 and 1426, respectively. In each case, the values are compared with a threshold value. As shown in FIG. 14, the threshold value may be, for example, 54. The results of the comparison in comparators 1420 and 1426 are utilized to determine the threshold values $T_{Vh}$ and $T_{Vv}$ in comparators 1424 and 1430, respectively. The detection threshold values $T_{Vh}$ and $T_{Vv}$ are again function of the respective detected modules $M_h$ and $M_v$. In the implementation, the $T_{Vh}$ value is given by:

$$T_{Vh} = T_{V1} \text{ if } M_h < T \quad (39a)$$

$$T_{Vh} = T_{V2} \text{ if else} \quad (39b)$$

Similar definition can be made for the vertical threshold $T_{Vv}$. In some embodiments, $T_{v1}$ can be 30 and $T_{v2}$ can be 40.

The results of comparators 1424 and 1430 are presented to OR gate 1432. The outputs of comparator 1418, OR gate 1432, and the inverse of parameter PERhd(x) 750 are input to AND gate 1434, which executes the logic (Comparator 1418 AND OR 1432) AND NOT PERhd(x) 750. The output signal from AND 1434 is input to AR binary filter 3×3 1436 for decision consolidation. Again, AR binary filter 1436 is similar to binary filter 1103 executing equation (34). The output from AR filter 1436 is then input to LP 5×5 filter 1438 and multiplier 1440 can be of gain 10/16, which is used for a soft mixing. The unitary gain LP impulse response for filter 1438 can be given by $$\begin{pmatrix} 1 & 2 & 2 & 2 & 1 \\ 2 & 4 & 4 & 4 & 2 \\ 2 & 4 & 4 & 4 & 2 \\ 2 & 4 & 4 & 4 & 2 \\ 1 & 2 & 2 & 2 & 1 \end{pmatrix} / 64 \quad (40)$$

The filtered correction map $a_4(x)$ 1077 is sent to Blending 1007 for application.

Figure 15:
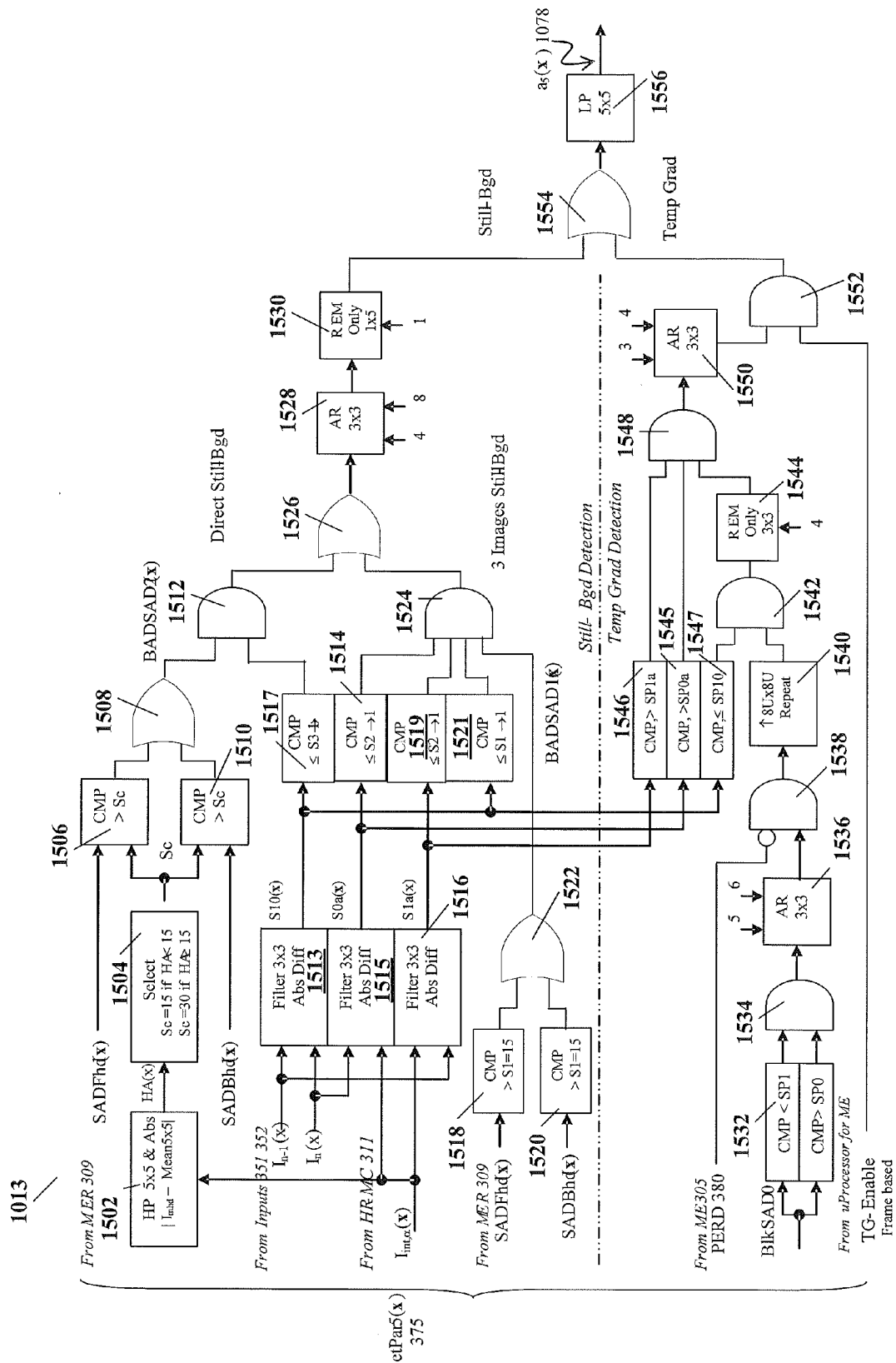
FIG. 15 shows a block diagram of Still Background and Temporal Grading Detection according to some embodiments of the present invention.
Figure 16:
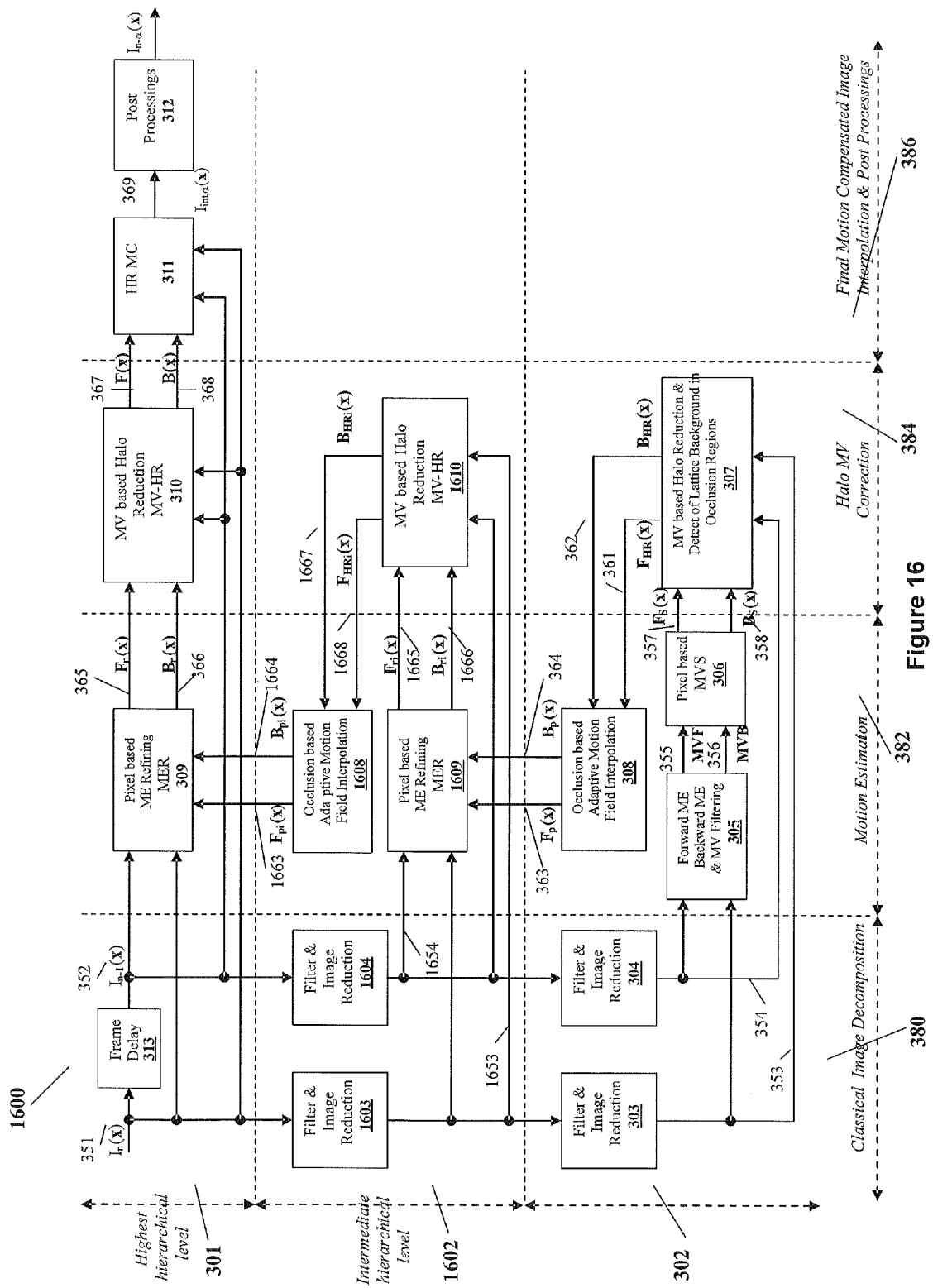
FIG. 16 shows a block diagram of an embodiment of a hierarchical image interpolator consistent with the present invention.

FIG. 15 illustrates an example of detection 1013, which is the combined Still Background and Temporal Grading Detection for Blending 1008. The paramters SetPar5(x) 375, as shown in FIG. 16, includes the parameters SADFhd(x) and SADBhd(x) calculated in MER 309, image inputs $I_n(x)$ 351 and $I_{n-1}(x)$ 352, PERD 380 and BlkSAD0 from ME 305, $I_{int,\alpha}(x)$ from HR-MC 311, and a frame-based TG-Enable is provided from ME 305, MER 309, HR-MC 311, Input Images $I_n(x)$, $I_{n-1}(x)$ and a binary frame-based signal TG-Enable from an ME microcontroller (not illustrated). Still Background and Temporal Grading are two different events or aspects; however their detections imply enough common resources that it is convenient to group them together.

Still Background Detection is helpful for eventual Halo effect reduction and complementary to the previously discussed MV-HR technique. The phenomenon occurs when thin ("see-through") foreground objects, such as an iron railing or hammock net, are moving at a certain speed against a background that is fixed but textured. The estimated forward or backward motion vectors, even for foreground as well background, are dominated by the foreground displacement and result in a halo effect in the textured background. The previous proposed correction technique do not handle this situation when the displacement is outside the local window I×J limits Fortunately, in many practical cases, the background is fixed or slowly moving. If still background can be detected then the correction can be made.

As illustrated by FIG. 15, images $I_n(x)$ 351 and $I_{n-1}(x)$ 352 are input to filter 1513 where an absolute difference filter produces an output S10(x). In order to get a consistent detection, filter 1513 is applied on the image absolute difference between $I_n(x)$ 351 and $I_{n-1}(x)$ 352. The filter impulse response of filter 1513 can be described by:

$$\begin{pmatrix} 3 & 4 & 3 \\ 4 & 4 & 4 \\ 3 & 4 & 3 \end{pmatrix} / 32 \quad (41)$$

Filter 1513 is followed by a comparator as a decision mechanism. The output from comparator 1517, which is high if S10(x) is less than a threshold S3, is provided to AND 1512 along with the output determination from a BADSAD2(x)

determination. In order to reduce possible false detection, Direct Still Background Detection is enabled only in a BAD-SAD2(x) zone, i.e. in a zone of relatively great SAD.

As shown in FIG. 15, the value $I_{int,\alpha}(x)$ 369 is input to HP block 1502, which provides an absolute value of the difference between $I_{int,\alpha}(x)$ 369 and a 5×5 mean HA(x). In select 1504, a threshold value Sc is chosen based on the value of HA(x). For example, if HA<15 Sc may be set at 15 but if HA≧15 then Sc may be set at 30. In comparator 1506, the value SADfhd(x) is compared with Sc and a positive result is provided if SADfhd(x) is greater than Sc. Similarly, comparator 1510 provides a positive result if SADBhd(x) is greater than Sc. The results of comparators 1510 and 1506 are provided to OR gate 1508, which provides a bad SAD determination to AND 1512, which also receives the output signal from comparator 1517.

Similarly, a second group of 3-Images Still Background Detection that is based on the filtered absolute image differences of the 2 inputs images $I_n(x)$ 351, $I_{n-1}(x)$ 352 and the considered interpolated image $I_{int,\alpha}(x)$ 369 is performed. As shown in FIG. 15, filter 1515 provides the filtered absolute difference between $I_n(x)$ 351 and $I_{int,\alpha}(x)$ 369, S0a(x), and filter 1516 provides the filtered absolute difference between $I_{n-1}(x)$ 352 and $I_{int,\alpha}(x)$ 369, S1a(x). The output signal from filter 1515 is input to comparator 1514 where a positive result is generated if the value S0a(x) is less than or equal to threshold S2. The output signal from filter 1516 is input to comparator 1519 where a positive result is generated if the value S1a(x) is less than the threshold S2. Further, the output from filter 1513 S10(x) is input to comparator 1521 where a positive result is generated if S10(x) is less than the threshold value S1. The results of comparator 1514, comparator 1519, and comparator 1521 are input to AND 1524 along with the results of another bad SAD determination so that the 3-Images Still Background Detection is enabled only in turn in a BADSAD1(x) zone.

As shown in FIG. 15, SADFhd(x) is input to comparator 1518, which produces a positive result if SADFhd(x) is greater than threshold S1. In some embodiments, for example, threshold S1 can be set to 15. Similarly, SADBhd(x) is input to comparator 1520, which produces a positive result of SADBhd(x) is greater than threshold S1. The results from comparator 1518 and comparator 1520 are input to OR 1522, which produces the bad SAD determination that enables the determination made by AND 1524.

The Still Background Detection indicated by AND 1512 and the still background detection indicated by AND 1524 are provided to OR gate 1526. The output signal from OR gate 1526 is filter in AR filter 1528, which is similar to binary filter 1103 and executes equation (34), for a decision consolidation. A remove only binary filter 1530 is then executed to provide a still background determination. Remove only binary filter 1530 can be similar to binary filer 1103 executing equation (35).

Temporal Grading is a phenomenon where the scene illumination slowly varies, but incurs enough change from one image to another to fool the ME into generating unreliable MVs. Time lapse sequences or a sunset scene are possible examples. In the following, a principle of Temporal Grading Detection will be described.

The embodiment of Temporal Grading Detection illustrated by FIG. 15 can be considered a grouping of 3 correction conditions which are based essentially on the 3 images $I_n(x)$, 351 $I_{n-1}(x)$ 352 and the interpolated $I_{int,\alpha}(x)$ 369. The first condition check notable change between the 2 images $I_n(x)$ 351 and $I_{int,\alpha}(x)$ 369. The first condition is executed in comparison 1546, which receives the output signal from filter 1516 and provides a positive result if S1a(x) is greater than a threshold value SP1a. The second condition checks for a similar change between $I_{n-1}(x)$ 352 and $I_{int,\alpha}(x)$ 369. The second condition is executed in comparison 1545, which receives the output signal from filter 1515 S0a(x) and provides a positive result if S0a(x) is greater than a threshold SP0a. The third condition, however, specifies possible corrected zone characteristics: non-periodic and similar intensity regions between $I_{n-1}(x)$ and $I_n(x)$. The third condition is executed in comparator 1547, which receives the output signal from filter 1513 and produces a positive result if S10(x) is less than or equal to a threshold value SP10.

Furthermore, the corresponding block-based SAD of zero motion provided from ME should be neither very high nor very low. The block-based SAD determination is provided by comparators 1532 and AND 1534, which produce a positive result if the block SAD parameter BlkSAD0 is between threshold values SP0 and SP1. The output from AND is filter in AR filter 1536, which is similar to filter 1103 executing Equation (34). The result from filter 1536 is input to AND gate 1538 with NOT PERD 380 and the up-converted in repeater 1540, which may be a 8U×8U up-converter. The output from repeater 1540 along with the output from comparator 1547 is provided to AND gate 1542. The output from AND gate is input to remove only filter 1544, which is similar to filter 1103 executing Equation (35). The output from filter 1544 is input, along with the outputs from comparators 1546 and 1545, to AND gate 1548. The output from AND gate 1548 is input to AR filter 1550, which is substantially similar to filter 1103 executing Equation (34).

Finally, a frame-based binary signal TG-Enable is provided by the ME microcontroller (not illustrated) and provided to AND gate 1552 along with the output from filter 1550 to reduce eventual false decisions or undesirable artifacts, the conditions upon which these artifacts may occur are cumulated; these include, but are not restricted to, lattice information and associated motion vector.

Sill Background and Temporal Grading detections are combined via Or gate 1554 and smoothed finally by a 5×5 LP filter described as in Equation (40). The resulting parameter $a_5(x)$ 1078 is provided to blending 1008.

This completes the description of FIG. 3 illustrating a two-level hierarchical approach with Halo consideration for a HD-FRC. FIG. 16 illustrates a 3-level FRC 1600 according to some embodiments of the present invention. Such an embodiment can be useful for super high-definition, for example. In order to simplify the drawing, only main signal connections are illustrated. As is shown in FIG. 16, FRC 1600 can be formed from FRC 300 by addition of an intermediate hierarchical level 1602 between high level 301 and low level 302. As such, in FIG. 16 the system blocks with the same functionality to those of FIG. 3 will be denoted by the same block number. With regard to connected signals, the same notations are re-used except for intermediate hierarchical level, the indices "i" are added for clarification purposes.

As shown in FIG. 16, images $I_n(x)$ 351 and $I_{n-1}(x)$ are reduced and filtered in filters 1603 and 1604, respectively, before being presented to filters 303 and 304. The output images from filters 1603 and 1604, images 1653 and 1654, respectively, are input to MER 1609. The output signals from MV 308, $F_p(x)$ 363 and $B_p(x)$ 364, are also input to MER 1609. MER 1609 performs the same, as does MER 309, discussed above, except at the intermediate resolution level of intermediate level 1602. Similar to the high level processing discussed with respect to FRC 300, the output signals from MER 1609, $F_{ri}(x)$ 1665 and $B_{ri}(x)$ 1666 are input to MV-HR 1610, which operates in the same fashion as MER 310, discussed above. The output signals from MV-HR 1610 is input to $F_{HRi}(x)$ 1668 and $B_{HRi}(x)$ 1667 are input to interpolator 1608, which operates the same as interpolator 308 discussed above, to produce signals $F_{pi}(x)$ 1663 and $B_{pi}(x)$ 1664, which are then input to MER 309.

Similarly to FIG. 16, any number of intermediate levels can be added. Of course, each block in each level should operate with corresponding inputs and signals provided from a lower-level processing, which should be adequately up-converted when required.

Embodiments of the application can be implemented on any machine capable of processing image data. For example, embodiments can be implemented on a processor executing software code that implements the functions discussed here. Such software can be stored on any computer medium, including, for example, hard drives, memory, and removable drives. Additionally, embodiments can be implemented on a dedicated ASIC with a processor and memory.

Certain numerical examples have been provided throughout the disclosure. For example, although particular filter impulse functions and threshold values have been described, one skilled in the art will realize that other impulse functions and other threshold values may also be applicable. These particular numerical examples are provided for clarity only and should not be considered limiting.

Some embodiments of the present invention can significantly reduce the system complexity for high definition signals as well as the appearance of halo, flickering and block artifact in interpolated images for real-time applications. It should be appreciated by those skilled in the art that certain steps or components could be altered without departing from the scope of the embodiments presented herein. As such, the present invention should be limited only by the following claims.

We claim:

1. A method of interpolating a high definition image between a first image and a second image, comprising:
   reducing the first image and the second image to form a first lower image and a second lower image;
   estimating block-based motion vectors from the first lower image and the second lower image;
   selecting pixel-based motion vectors based on the block-based motion vectors;
   filtering the pixel-based motion vectors for halo reduction from the selected motion vectors to form filtered motion vectors, wherein filtering the pixel-based motion vectors for halo reduction includes correcting a motion vector at a central pixel if the central pixel has a dissimilar intensity to a group of pixels that have similar motion vectors;
   occlusion-based, adaptively interpolating the filtered motion vectors to provide for higher resolution motion vectors with a higher resolution;
   refining high resolution motion vectors that are derived from the higher resolution motion vectors to form refined motion vectors;
   providing high resolution halo reduction to the refined motion vectors; and
   interpolating an interpolated image between the first image and the second image based on the refined motion vectors.

2. The method of claim 1, wherein the higher resolution is consistent with resolution of the first image and the second image.

3. The method of claim 1, wherein reducing the first image and the second image to form the first lower image and the second lower image includes:
   reducing the first image and the second image to form a first intermediate image and a second intermediate image; and
   reducing the first intermediate image and the second intermediate image to form the first lower image and the second lower image.

4. The method of claim 3, wherein the higher resolution is consistent with the first intermediate image and the second intermediate image, and further including:
   refining the higher resolution motion vectors to provide refined intermediate motion vectors;
   providing halo reduction to the refined intermediate motion vectors to provide filtered intermediate motion vectors; and
   occlusion-based, adaptively interpolating the filtered motion vectors to provide for high resolution forward motion vectors and backward motion vectors.

5. The method of claim 1, wherein motion vectors includes forward motion vectors and backward motion vectors.

6. The method of claim 1, wherein reducing the first image and the second image further includes anti-alias filtering.

7. The method of claim 1, wherein selecting pixel-based motion vectors includes, for each pixel, selecting one of a plurality of surrounding block-based motion vectors that pass through the pixel based on a sum of absolute differences determination.

8. The method of claim 1, wherein filtering the pixel-based motion vectors further includes detection of lattice or periodic backgrounds in occlusion regions.

9. The method of claim 1, wherein adaptively filtering includes
   determining a binary segmentation result for each pixel in a window around a central pixel depending on whether the pixel is in a zone of no occlusion, a zone of backward MV, and a zone of forward MV;
   adaptively filtering the filtered motion vectors; and
   up-converting to form the higher resolution motion vectors.

10. The method of claim 1, wherein refining high resolution motion vectors includes
    deriving sum of absolute differences in a first search range adjacent to a central pixel and in a second search range at a distance related to an up-conversion factor from the central pixel;
    selecting a motion vector for the central pixel based on the sum of absolute differences.

11. The method of claim 10, wherein if the sum of absolute differences is substantially the same between two or more motion vectors, then selecting the motion vector based on a prioritization.

12. The method of claim 1, wherein providing high resolution halo reduction to the refined motion vectors includes correcting a motion vector at the central pixel if the central pixel has a dissimilar intensity to a group of pixels that have similar motion vectors.

13. The method of claim 1, wherein interpolating an interpolated image between the first image and the second image includes
    producing a first interpolated image based on the first image and a forward motion vector;
    producing a second interpolated image based on the second image and a backward motion vector;
    determining a mixing parameter; and
    mixing the first interpolated image and the second interpolated image according to the mixing parameter.

14. The method of claim 1, further including post processing the interpolated image by performing one or more corrections to the interpolated image, the one or more connections being coupled together in series.

15. The method of claim 14, wherein the one or more corrections includes a halo in lattice background correction, comprising:
   determining a linear interpolation from the first image and the second image;
   determining a mixing factor from a detection of lattice background in occlusion region parameter; and
   mixing an input interpolated image related to the interpolated image with the linear interpolation with the mixing factor.

16. The method of claim 14, wherein the one or more corrections includes a correction over areas containing lattice structures that are prone to generating image interpolation artifacts, comprising:
   determining a repeated interpolation image by setting the repeated interpolation image to the nearest one of the first image or the second image;
   determining a mixing factor from parameters calculated in low resolution, including periods of horizontal and vertical lattice structures, histograms of horizontal and vertical components of motion vectors, and sums of absolute differences calculated while estimating block-based motion vectors; and
   mixing an input interpolated image related to the interpolated image with the repeated interpolation image with the mixing factor.

17. The method of claim 14, wherein the one or more corrections includes a correction for outlying pixels, comprising:
   determining a mean image;
   determining a mixing factor by considering isolated motion vectors, isolated pixels with unaligned motion vectors in a bad sum of absolute differences region, and an edge map; and
   mixing an input interpolated image related to the interpolated image with the mean image with the mixing factor.

18. The method of claim 14, wherein the one or more corrections includes a correction for unaligned motion vectors, comprising:
   determining a linear interpolation;
   determining a mixing factor by considering motion vectors and the difference between the first image and the second image;
   mixing an input interpolated image related to the interpolated image with the linear interpolation.

19. The method of claim 14, wherein the one or more corrections includes a correction for still background, comprising:
   determining a linear interpolation;
   determining a mixing factor from differences between the first image, the second image, and the interpolated image; and
   mixing an input interpolated image related to the interpolated image with the linear interpolation.

20. The method of claim 19, further including correction for temporal gradient, wherein the mixing factor also depends on illumination differences between images.

21. A hierarchical resolution image interpolator, comprising:
   an image reducer that provides a first lower image and a second lower image from a first image and a second image;
   a block-based motion estimator coupled to the image reducer that provides block-based motion vectors based on the first lower image and the second lower image;
   a motion vector selector coupled to the block-based motion estimator that provides pixel-based motion vectors based on the block-based motion vectors;
   a halo-reduction filter coupled to the motion vector selector that filters the pixel-based motion vectors to form filtered motion vectors by correcting a motion vector at a central pixel if the central pixel has a dissimilar intensity to a group of pixels that have similar motion vectors;
   an occlusion-based adaptive interpolator coupled to the halo-reduction filter to provide for higher resolution motion vectors based on the filtered motion vectors;
   a high-resolution refiner coupled to receive high-resolution motion vectors related to the higher-resolution motion vectors and form refined motion vectors;
   a high-resolution halo-reduction filter coupled to the high-resolution refiner to further filter the refined motion vectors to form filtered refined motion vectors; and
   an interpolator coupled to the high-resolution halo-reduction filter, the interpolator providing an interpolated image between the first image and the second image based on the filtered refined motion vectors.

22. The image interpolator of claim 21, wherein the higher resolution is consistent with resolution of the first image and the second image.

23. The image interpolator of claim 21, wherein the image reducer further provides a first intermediate image and a second intermediate image, wherein the higher resolution is consistent with resolution of the first intermediate image and the second intermediate image, and further including:
   an intermediate-resolution refiner coupled to receive the higher-resolution motion vectors and form intermediate refined motion vectors, the higher-resolution motion vectors having a resolution consistent with the first intermediate image and the second intermediate image;
   an intermediate-resolution halo-reduction filter coupled to the intermediate-resolution refiner to further filter the intermediate refined motion vectors to form intermediate filtered refined motion vectors; and
   an intermediate occlusion-based, adaptive interpolator coupled to the intermediate-resolution halo-reduction filter to provide for the high resolution motion vectors based on the intermediate filtered motion vectors.

24. The image interpolator of claim 21, wherein the image reducer includes an anti-aliasing filter.

25. The image interpolator of claim 21, wherein the motion vector selector selects, for each pixel, one of a plurality of surrounding block-based motion vectors that pass through a pixel based on a sum of absolute differences determination.

26. The image interpolator of claim 21, wherein the halo-reduction filter further includes a lattice or periodic background detector that detects lattice or periodic background in occlusion regions.

27. The image interpolator of claim 21, wherein the occlusion-based adaptive interpolator includes
   a binary segmentation determiner that determines a binary segmentation result for each pixel in a window around a central pixel depending on whether the pixel is in a zone of no occlusion, a zone of backward MV, and a zone of forward MV;
   an adaptive filter that filters the filtered motion vectors based on the binary segmentation; and
   an up-converter coupled to the adaptive filter to form the higher resolution motion vectors.

28. The image interpolator of claim 21, wherein the high-resolution refiner includes
   a SAD determiner that derives a sum of absolute differences in a first search range adjacent to a central pixel and in a second search range at a distance related to an up-conversion factor from the central pixel; and a motion vector selector that selects a motion vector for the central pixel based on the sum of absolute differences.

29. The image interpolator of claim 28, wherein if the sum of absolute differences is substantially the same between two or more motion vectors, then the motion vector selector selects the motion vector based on a prioritization.

30. The image interpolator of claim 21, wherein the high-resolution halo reduction filter provides high resolution halo reduction to the refined motion vectors by correcting a motion vector at the central pixel if the central pixel has a dissimilar intensity to a group of pixels that have similar motion vectors.

31. The image interpolator of claim 21, wherein the interpolator provides the interpolated image by producing a first interpolated image based on the first image and a forward motion vector;

producing a second interpolated image based on the second image and a backward motion vector;

determining a mixing parameter; and mixing the first interpolated image and the second interpolated image according to the mixing parameter.

32. The image interpolator of claim 21, further including a post processor coupled to the interpolator, the post processor performing one or more corrections to the interpolated image coupled in series.

33. The image interpolator of claim 32, wherein the post processor includes a halo in lattice background correction, the halo in lattice background correction determining a linear interpolation from the first image and the second image;

determining a mixing factor from a detection of lattice background in occlusion region parameter; and mixing an input interpolated image related to the interpolated image with the linear interpolation with the mixing factor.

34. The image interpolator of claim 32, wherein the post processor includes a correction over areas containing lattice structures that are prone to generating image interpolation artifacts, the correction determining a repeated interpolation image by setting the repeated interpolation image to the nearest one of the first image or the second image;

determining a mixing factor from parameters calculated in low resolution, including periods of horizontal and vertical lattice structures, histograms of horizontal and vertical components of motion vectors, and sums of absolute differences calculated while estimating block-based motion vectors; and mixing an input interpolated image related to the interpolated image with the repeated interpolation image with the mixing factor.

35. The image interpolator of claim 32, wherein the post processor includes a correction for outlying pixels, the correction determining a mean image;

determining a mixing factor by considering isolated motion vectors, isolated pixels with unaligned motion vectors in a bad sum of absolute differences region, and an edge map; and mixing an input interpolated image related to the interpolated image with the mean image with the mixing factor.

36. The image interpolator of claim 32, wherein the post processor includes a correction for unaligned motion vectors, the correction determining a linear interpolation;

determining a mixing factor by considering motion vectors and the difference between the first image and the second image;

mixing an input interpolated image related to the interpolated image with the linear interpolation.

37. The image interpolator of claim 32, wherein the post processor includes a correction for still background, the correction determining a linear interpolation;

determining a mixing factor from differences between the first image, the second image, and the interpolated image; and mixing an input interpolated image related to the interpolated image with the linear interpolation.

38. The image interpolator of claim 37, further including a correction for temporal gradient wherein the mixing factor also depends on illumination differences between images.

* * * * *